(12) United States Patent
Watanabe et al.

(10) Patent No.: US 7,164,987 B2
(45) Date of Patent: Jan. 16, 2007

(54) MAP IMAGE DISPLAY APPARATUS, MAP IMAGE DISPLAY PROGRAM, AND MAP IMAGE DISPLAY METHOD

(75) Inventors: Masaki Watanabe, Yokohama (JP); Fumio Seto, Yokosuka (JP); Okihiko Nakayama, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 87 days.

(21) Appl. No.: 10/683,002

(22) Filed: Oct. 14, 2003

(65) Prior Publication Data

US 2004/0102897 A1 May 27, 2004

(30) Foreign Application Priority Data

Nov. 21, 2002 (JP) ............... P 2002-338025

(51) Int. Cl.
*G01C 21/30* (2006.01)
(52) U.S. Cl. .............. 701/208; 701/211; 701/212; 340/995.1; 340/995.17; 340/995.27; 340/995.14
(58) Field of Classification Search ............ 701/23–26, 701/207–212; 340/988–990, 995.1, 995.12, 340/995.19, 995.24, 995.27, 995.14, 995.17; 345/419, 473, 630
See application file for complete search history.

(56) References Cited

U.S. PATENT DOCUMENTS

| | | | | |
|---|---|---|---|---|
| 6,311,126 B1 * | 10/2001 | Katayama et al. | .......... | 701/208 |
| 6,320,517 B1 * | 11/2001 | Yano et al. | ............. | 340/995.15 |
| 6,449,557 B1 * | 9/2002 | Ata et al. | ................... | 701/208 |
| 6,897,861 B1 * | 5/2005 | Watanabe et al. | ........... | 345/419 |
| 2004/0073563 A1 * | 4/2004 | Uchida | ........................ | 707/100 |

FOREIGN PATENT DOCUMENTS

JP        7-319383      12/1995

\* cited by examiner

*Primary Examiner*—Gertrude A. Jeanglaude
(74) *Attorney, Agent, or Firm*—McDermott Will & Emery LLP

(57) ABSTRACT

A map image display apparatus for displaying a map image with at least one name for entering a command to change the map image, and switching the displayed map image, when accepting the command with the name designated, to a map image in a vicinity of the designated name. The apparatus includes a defined region storage device which stores information of a name-defined region indicated by the name, a center position thereof, and a display scale enabling displaying substantially the whole name-defined region within one screen; and a display target determination device which determines a map image to be displayed at the display scale with the center position of the name-defined region taken as a display center, referring to the stored information.

22 Claims, 14 Drawing Sheets

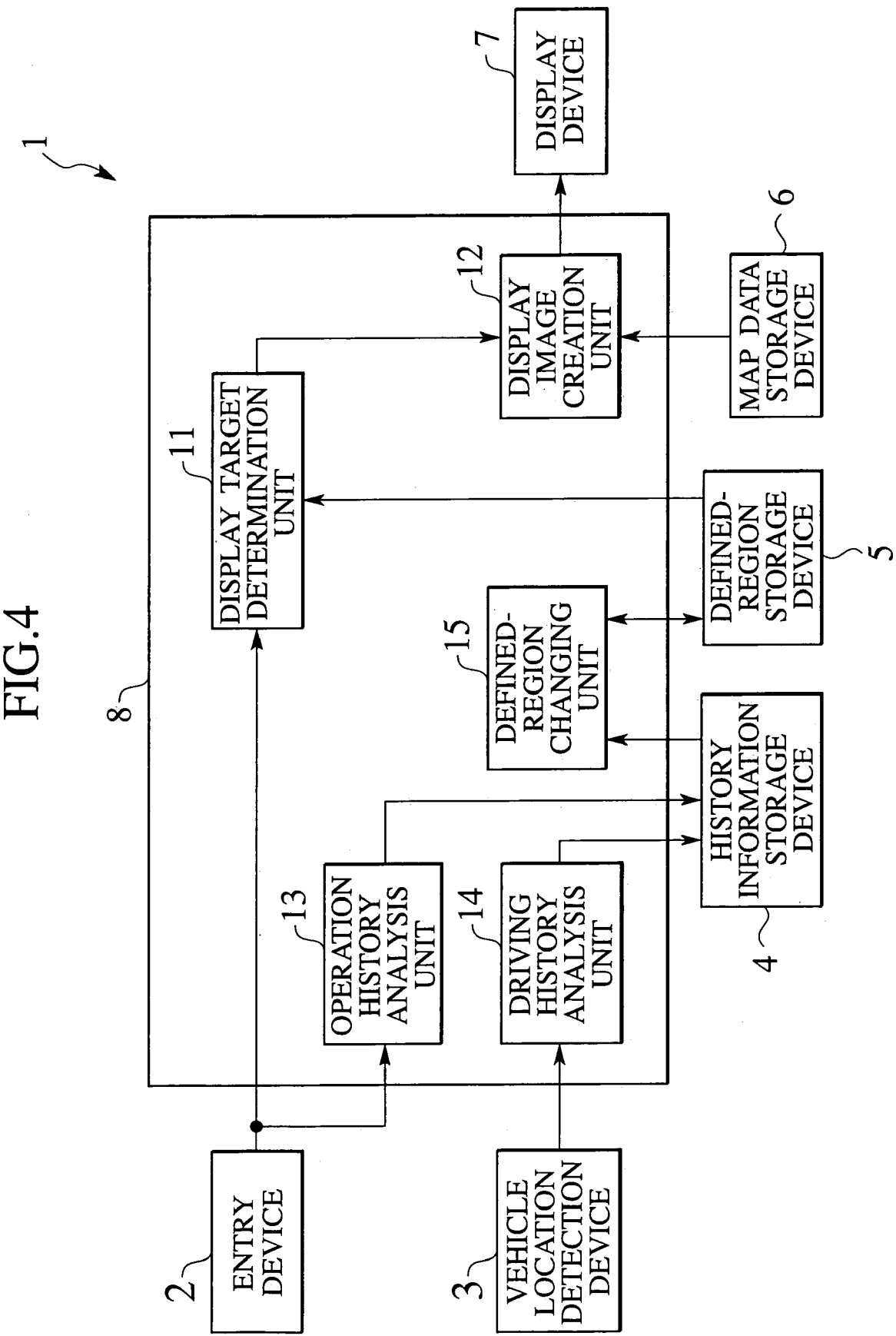

FIG.9

| TOTAL NUMBER OF DEFINITION-AFFECTING ACTIONS | | 58 |
|---|---|---|
| ELEMENT REGION | NAKA-KU | 14 |
| | NISHI-KU | 23 |
| | MINAMI-KU | 2 |
| CANDIDATE REGION | KANAGAWA-KU | 18 |
| | HODOGAYA-KU | 0 |
| | TOTSUKA-KU | 0 |
| | KONAN-KU | 0 |
| | ISOGO-KU | 1 |

FIG.10

| IMPLEMENTATION DISTANCE | NUMBER OF DEFINITION-AFFECTING ACTIONS | CURRENT DISTANCE |
|---|---|---|
| 100m AND BELOW | 11 | ✓ |
| OVER 100m TO 500m | 24 | |
| OVER 500m TO 1km | 13 | |
| OVER 1km TO 2.5km | 3 | |
| OVER 2.5km TO 5km | 0 | |
| OVER 5km TO 10km | 0 | |
| TOTAL | 51 | |

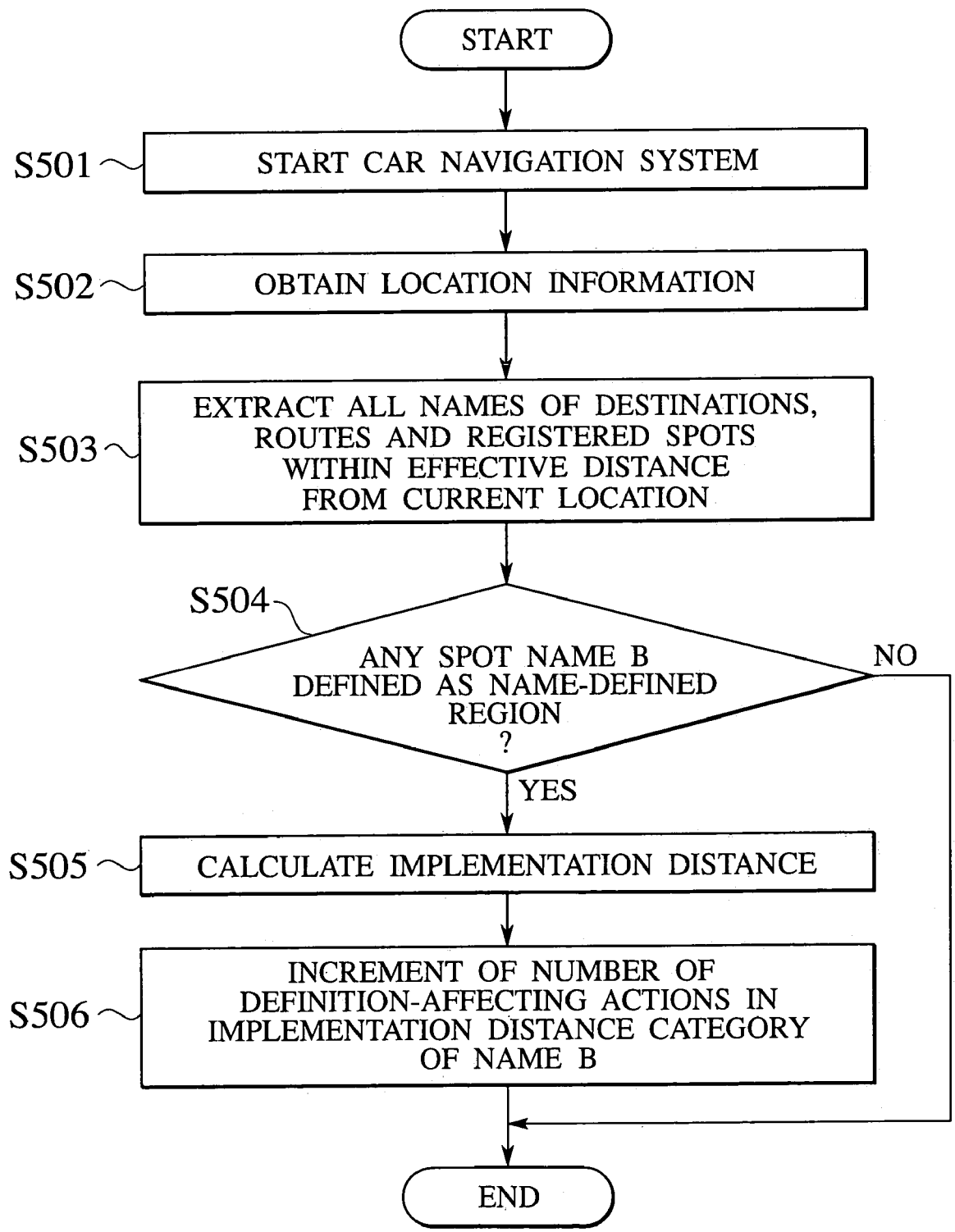

MAP IMAGE DISPLAY APPARATUS, MAP IMAGE DISPLAY PROGRAM, AND MAP IMAGE DISPLAY METHOD

BACKGROUND OF THE INVENTION

1. Field of the Invention

The present invention relates to a map image display apparatus, a map image display program and a map image display method, which are suitably applied to a car navigation system and the like.

2. Description of the Related Art

As an apparatus for assisting comfortable driving of a vehicle, a car navigation system has been widespread. The car navigation system has a function to display a map image, and is generally configured to determine a map image to be displayed based on a command entered by a user or a current location of the vehicle, and to guide the vehicle on a desired route while displaying the determined map image including names of places, facilities and the like.

In recent years, as a car navigation system has improved in operability, a car navigation system of a voice input type, which has been configured to realize an entry of a command from a user by the voice thereof, has also been developed and put into practical use. As such a car navigation system of a voice input type, there has also been one proposed, which uses place and facility names displayed on the map image as target vocabularies for voice recognition, and has been configured to switch the map images to be displayed to a map image in the vicinity of any of the names when the name is spoken by the user.

In a car navigation system disclosed in Japanese Patent Application Laid-Open No. H7-319383 (published in 1995), target names for the voice recognition, which include those of places, facilities and the like, are displayed on a map image, and therefore, a user can grasp a name for entering a command while referring to the map image.

SUMMARY OF THE INVENTION

However, the foregoing car navigation system, when a command is entered with a name on a displayed map image designated, switches map images to display the designated name at a substantial center of a switched map image, based on location information of the name on the displayed map image. Therefore, the system has involved a problem that such a map image to be newly displayed is not always displayed in a mode reflecting the user's intent.

When accepting a command to change the map image, in which a place-name indicating a region is designated, it has been desirable to display a map image in a mode showing the whole region indicated by this name in most detail. However, in the foregoing car navigation system, the map image to be newly displayed is not always displayed in such a mode. Therefore, in some cases, the user must further perform operations such as scrolling a screen and repeatedly switching the image until an intended map image is displayed.

The present invention was created in order to solve the problems as described above. It is an object of the present invention to provide a map image display apparatus capable of displaying a new map image in an optimal mode reflecting the user's intent, when a user enters a command to change a map image with a name therein designated, and to provide a map image display program and a map image display method, which enable such a display.

The map image display apparatus of the present invention is configured to define in advance a region designated by each name displayed on the map image (name-defined region) as a target in which a user command is to be entered, and to display a map image showing substantially the whole region of the name-defined region in as much detail as possible when accepting a command to redisplay the map image with the name designated.

An aspect of the present invention is a map image display apparatus for displaying a map image with at least one name for entering a command to change the map image superimposed on the map image, and for switching the displayed map image, when accepting the command in which any of the displayed name is designated, to a map image in a vicinity of the designated name, the apparatus comprising: a defined region storage device configured to store information of a name-defined region defined as a region indicated by the name, information of a center position of the name-defined region, and information of a display scale at which substantially a whole of the name-defined region is displayable within one screen; and a display target determination device configured to determine, when accepting the command, a map image to be displayed at the display scale with the center position of the name-defined region taken as a display center, referring to the information stored in the defined region storage device.

BRIEF DESCRIPTION OF THE DRAWINGS

The invention will now be described with reference to the accompanying drawings wherein:

FIGS. 1A to 1C, 2A, 2B, 3A and 3B are for explaining an outline of the present invention, in which:

FIG. 1A is a view showing a map image including a part of "Yokohama-shi" as a target to be displayed;

FIG. 1B is a view showing a map image displayed when accepting a command to change the displayed map image of FIG. 1A, in which a name of "Nishi-ku" is designated, showing substantially the whole region of "Nishi-ku" in detail;

FIG. 1C is a view showing a map image displayed when accepting a command to change the displayed map image of FIG. 1A, in which a name of "Yokohama-shi" is designated, showing substantially the whole region of "Yokohama-shi" widely;

FIG. 2A is a view showing an example of name-defined regions of "Yokohama";

FIG. 2B is a view showing an example of name-defined regions of "Yokohama" after a redefinition;

FIG. 3A is a view showing a mode of a name-defined region of a name indicating a location, in which a circular region of a predetermined size with "Yokohama station" taken as a center is defined as a name-defined region of "Yokohama station"; and FIG. 3B is a view showing another mode of the name-defined region of the name indicating the location, in which a rectangular region of a predetermined size with "Yokohama station" taken as a center is defined as the name-defined region of "Yokohama station".

FIG. 4 is a block diagram schematically showing a configuration of a car navigation system to which the present invention is applied.

FIG. 9 is a table showing an example of a storage mode of history information stored in a history information storage device of the car navigation system, showing history information of "Yokohama".

FIG. 10 is a table showing another example of the storage mode of the history information stored in the history information storage device of the car navigation system, showing history information of "Yokohama Station".

FIG. 14 is a flowchart showing another example of the processing for accumulating the history information indicating the driving history of the vehicle in the car navigation system.

FIGS. 15A and 15B are views showing a specific example of replacing an element region and candidate regions in a definition-varied name by regions in a lower hierarchy, in which:

FIG. 15A is a view showing a state before the regions are replaced, in which the definition-varied name is "Yokohama", the element region is "Nishi-ku", and the candidate regions are "Kanagawa-ku", "Hodogaya-ku", "Naka-ku" and "Minami-ku"; and FIG. 15B is a view showing a state after the regions are replaced, in which the definition-varied name is "Yokohama", the element regions are "Minato-mirai", "Sengen-cho", "Tobe-cho" and the like, and the candidate regions are "Tsuruya-cho", "Tennou-cho", "Sakuragi-cho" and the like.

DETAILED DESCRIPTION OF THE PREFERRED EMBODIMENT

Figure 1B:
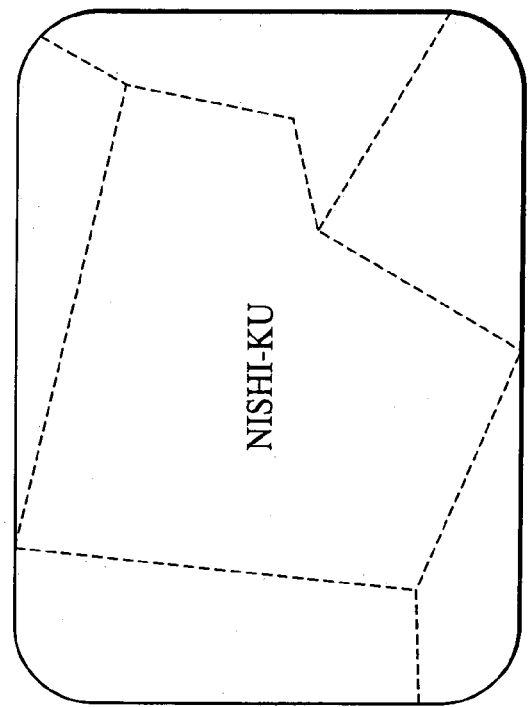

An embodiment of the present invention will be explained below with reference to the drawings, wherein like members are designated by like reference characters.

In the description below, "Tokyo-to" means the Metropolis of Tokyo. The "Ken" of "Kanagawa-ken", "Chiba-ken" or the like means "prefecture". The "Shi" of "Atsugi-shi", "Kawasaki-shi" or the like means "city". The "Ku" of "Kanagawa-ku", "Nishi-ku" or the like means "ward". The "Cho or machi" of "Sengen-cho", "Tobe-cho" or the like means "town".

A map image display apparatus of the present invention is configured to extract names for accepting commands from among names of places, facilities and the like, included in a map image to be displayed, to superimpose the extracted names on the map image, and, when a user enters a command to change the map image, designating one of the names, to display a map image showing substantially the whole region indicated by the designated name in as much detail as possible.

Figure 1C:
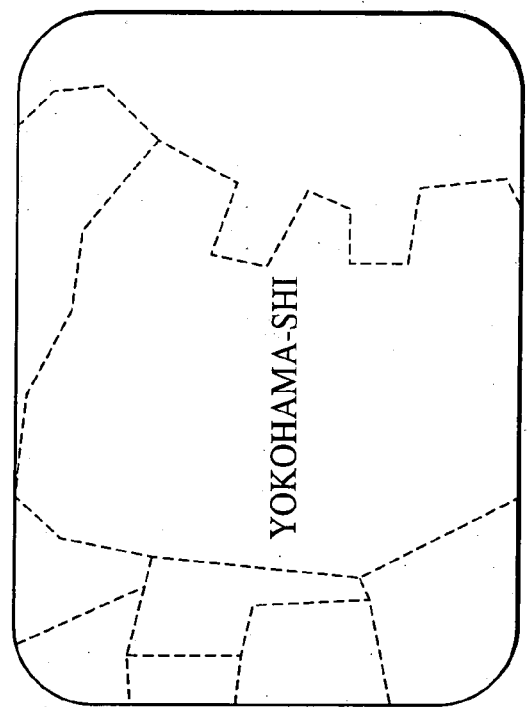
Figure 1A:
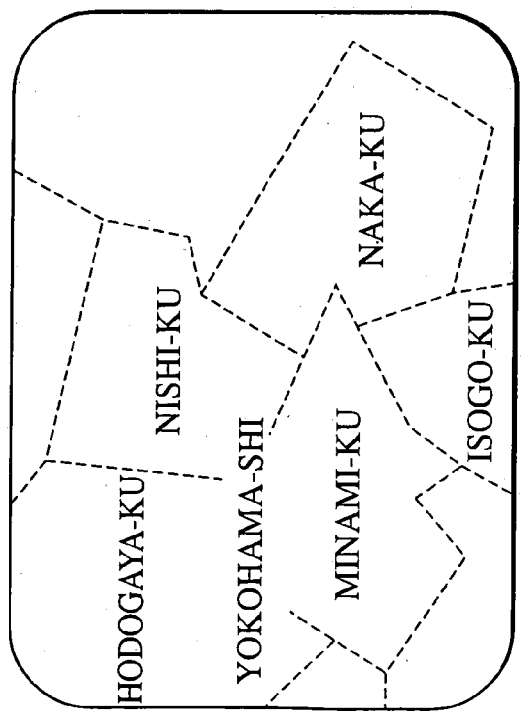

Specifically, for example, if a user command to change a map image, designating a place-name of "Nishi-ku", is entered when a map image of a part of "Yokohama-shi" is displayed as shown in FIG. 1A, the displayed map image is switched to a map image as shown in FIG. 1B, which shows substantially the whole region indicated by the place-name of "Nishi-ku" in as much detail as possible within one screen. Moreover, for example, if a user command to change a map image, designating a place-name of "Yokohama-shi", is entered when the map image of a part of "Yokohama-shi" is displayed as shown in FIG. 1A, the displayed map image is switched to a map image as shown in FIG. 1C, which shows substantially the whole region indicated by the place-name of "Yokohama-shi" in as much detail as possible within one screen.

Here, if a name being displayed on the map image is a place-name indicating an administrative district such as "Nishi-ku" and "Yokohama-shi", which has its region objectively defined, a region to be displayed can be uniquely identified. Accordingly, in the present invention, such a region objectively determined by a place-name indicating an administrative district is defined as a region indicated by the name in advance. Hereinafter, such a region to be defined as the region indicated by the name in the above-described manner will be referred to as a name-defined region. Then, when accepting a command to change the map image, in which such a name is designated, substantially the whole name-defined region of the designated name is displayed in detail.

Moreover, for example, a place-name conceptually specified, such as "Yokohama" and "Shonan", is interpreted differently depending on each individual in many cases, and a region indicated by the name cannot be uniquely identified. In the present invention, with regard to such a name conceptually specified, a region considered reasonable as a region indicated by the name is defined in advance as a name-defined region. Then, when accepting a command to change the map image, in which the name is designated, substantially the whole name-defined region of the designated name is displayed in detail. However, the name-defined region defined in such a manner does not always conform to the understanding of a user. Some individual may feel discomfort, in some cases, at a map image different from an assumed one, which is displayed when the command to change the map image is accepted, with a name thereof designated. The conceptually specified name is redefined according to needs, in a mode reflecting the user's interpretation thereof and his/her behavior pattern, thus realizing an optimal display of the map image customized for each user.

Note that, even when the name-defined region is determined by an objective index, such as the foregoing place-name indicating an administrative district, if it is determined that the user assumes, as a region indicated by the name, a district of a part of the name-defined region or a region out of the name defined region, the name-defined region may be redefined according to needs, in the mode reflecting the user's interpretation thereof and his/her behavior pattern.

The name-defined region is redefined based on history information indicating any of an operation history of the map image display apparatus of the present invention and a driving history of a vehicle on which the map image display apparatus is mounted and used. Specifically, in the case where a command to change the map image is first entered, in which a certain name is designated, and a map image in response to the entered command is displayed, and the next operation (setting of a destination, registration of a spot, redisplay of the map or the like) is performed, in which another name in the map image or in the vicinity thereof is designated, frequencies of the operations are accumulated for each designated name to be stored as history information. Moreover, when the vehicle is parked/stopped, occurrence frequencies of such parking/stopping are accumulated to be stored as history information, for each name of regions where the parking/stopping is performed. Then, the name-defined regions are redefined based on a comparison among the frequencies stored as history information in a way which excludes, from the name-defined regions, a region where the frequency as described above is low among the name-defined regions, or adds, to the name-defined regions, a region where the frequency is high among regions in the vicinity of the name-defined regions. The name-defined regions are thus redefined in a mode reflecting the user's interpretation thereof and his/her behavior pattern.

Figure 2A:
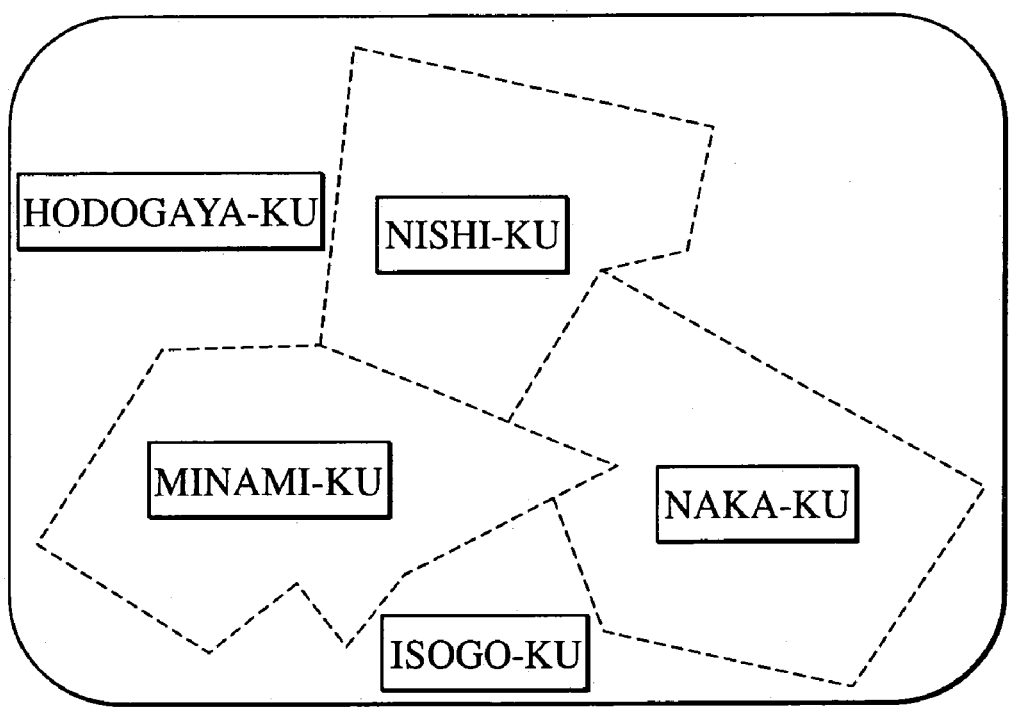
Figure 2B:
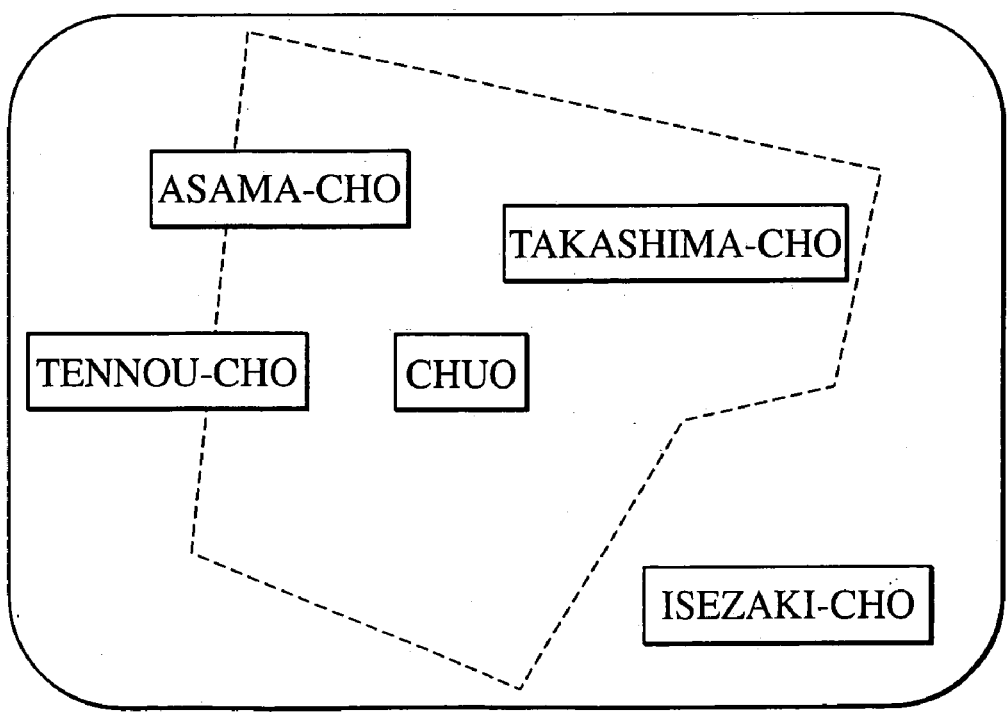

A specific example will be given below. A case is conceived, where the name-defined region of the name of "Yokohama" is defined, for example, as a region combining "Naka-ku", "Nishi-ku" and "Minami-ku". In this case, when accepting a command to change a map image in which the name of "Yokohama" is designated, a map image showing substantially the whole of the region combining "Naka-ku" "Nishi-ku" and "Minami-ku" will be displayed in a maximum enlargement mode as shown in FIG. 2A. Then, when the user frequently enters a command in which "Nishi-ku" is designated or when the user frequently parks/stops the vehicle in "Nishi-ku" in a state where such a map image is displayed, information thereof is stored as history information. Then, the name-defined region of the name of "Yokohama" is redefined as a region only of "Nishi-ku" according to needs based on the stored history information. Specifically, in this example, it can be assumed that the user is mainly interested in "Nishi-ku" and that the name of "Yokohama" mainly indicates "Nishi-ku" for the user when the user designates the name of "Yokohama". Therefore, the name-defined region of the name of "Yokohama" will be redefined only as the region of "Nishi-ku". Then, after such a redefinition of the name-defined region is performed, when the user enters a command to change the map image, in which the name of "Yokohama" is designated, the map image showing substantially the whole region of "Nishi-ku" in the maximum enlargement mode will be displayed as shown in FIG. 2B.

In the above, the names of places and the like, which indicate the regions having areas on the map image, have been described. In the map image display apparatus of the present invention, names of stations, intersections and the like, which indicate spots on the map image, are also to be displayed. When accepting a command to change a map image, in which a name indicating such a spot is designated, a map image of a region including the spot as a center will be displayed. When determining a map image to be displayed upon accepting such a designation of a name indicating the spot, a region to be displayed as a map image cannot be uniquely identified because the name is not a name indicating a region. Accordingly, in the present invention, with regard to such a name indicating the region, a region of a predetermined size with the spot taken as a center is defined in advance as a name-defined region indicated by the name.

Figure 3A:
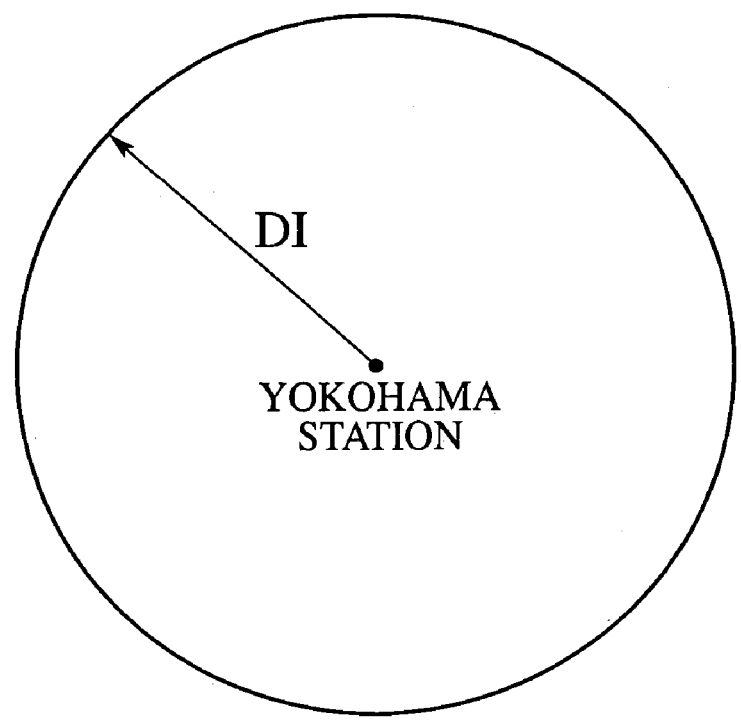
Figure 3B:
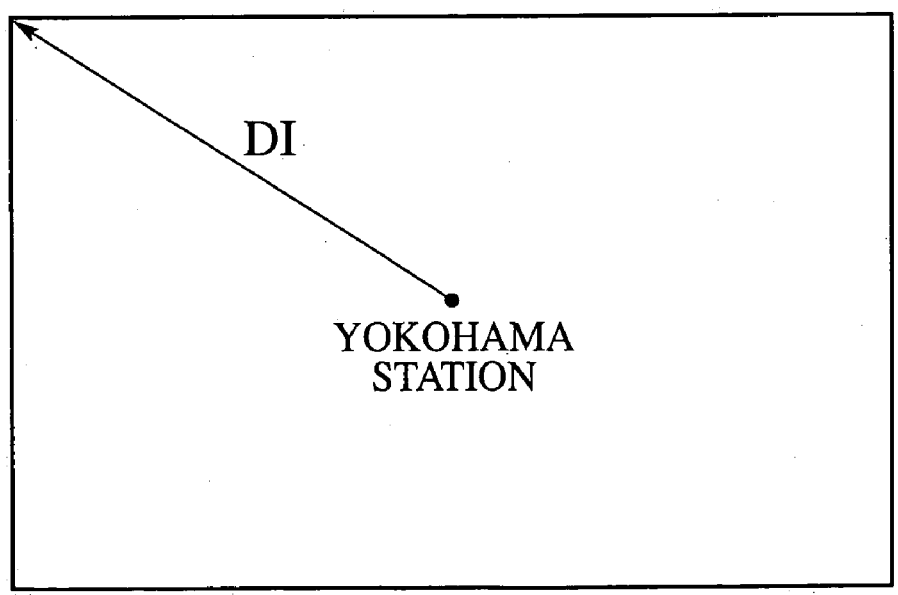

Specifically, for example, with regard to a name indicating a spot of "Yokohama station", a circular region of a predetermined size with "Yokohama station" taken as a center as shown in FIG. 3A or a rectangular region of a predetermined size with "Yokohama station" taken as a center as shown in FIG. 3B is defined in advance as the name-defined region. Then, when accepting a command to change a map image in which "Yokohama station" is designated, a map image displaying substantially the whole of the name-defined region defined as described above in detail will be determined as a display target.

Note that the name-defined region of such a name indicating the spot is defined for the sake of convenience, and this name-defined region is not always optimal to every user. Accordingly, also with regard to the name-defined region of the name indicating the spot, a size of the region is changed according to needs, namely, a distance from the center of the region to an outer edge thereof (hereinafter, referred to as an index distance DI) is increased/decreased, thus redefining the name-defined region in a mode reflecting the user's interpretation thereof and his/her behavior pattern.

In such a manner as described above, the name-defined region indicated by the name as a target in which the user command is to be entered is defined. Subsequently, in the present invention, name-defined region information, center position information, and optimal display scale information at which substantially the whole of the name-defined region can be displayed within one screen in most detail, are stored in association with name data accompanying map data. Then, when accepting a command to change a map image, in which the name is designated, a name-defined region corresponding to the name is identified, and a map image to be displayed is determined by use of the center position information and the optimal display scale information. Finally, a map image will be displayed at the optimal display scale with the center position of the name-defined region corresponding to the name taken as a display center.

Hence, by referring to the map image displayed in response to the entry of the command, the user can grasp the outline of the whole region indicated by the name designated by him/herself. Particularly, when performing an operation of changing a map image while exploring a target place, the user can easily find the target place without fail. Therefore, the operation of changing a map image can be performed extremely efficiently. Moreover, such a map image in an ideal display mode is suitably displayed by one operation, and therefore, the operation is extremely simple, and an improvement in operability will be realized.

Next, a specific embodiment in which the present invention is applied to a car navigation system displaying a map image and assisting driving of a vehicle will be described. A configuration example of the car navigation system to which the present invention is applied is schematically shown in FIG. 4. The car navigation system 1 of FIG. 4 includes an entry device 2, a vehicle location detection device 3, a history information storage device 4, a defined region storage device 5, a map data storage device 6, a display device 7, and a processor 8.

By the entry device 2, a user enters a variety of commands to the car navigation system 1, and specifically, for example, includes a voice input recognition device. When using the voice input recognition device as the entry device 2, the user can enter a variety of commands including the command to change a map image by voice, and thus improvement in operability is achieved. Note that, as the entry device 2, for example, other entry devices such as an operation switch, a joystick and a touch panel may be used. Moreover, a combination of the voice input recognition device and any of the other entry devices may be used. The user command entered from the entry device 2 will be sent to the processor 8.

The vehicle location detection device 3 is for detecting a current location of a vehicle on which the car navigation system 1 is mounted, and includes, for example, a GPS (Global Positioning System) receiver and a variety of sensors such as a geomagnetic sensor, a gyroscope and a distance sensor. Then, the vehicle location detection device 3 corrects an absolute position and orientation obtained from the GPS receiver based on outputs from the variety of sensors such as the geomagnetic sensor, the gyroscope and the distance sensor, and detects an accurate current location of the vehicle. Location information indicating the current vehicle location detected by the vehicle location detection device 3 will be sent to the processor 8.

The history information storage device 4 stores an operation history of the car navigation system 1 and a driving history of the vehicle on which the car navigation system 1 is mounted as history information. Specifically, for example, operation frequencies of an operation performed by designating a certain name in a map image or a name in the vicinity thereof in a state where the map image is displayed in response to an entered command to change a map image, in which the name is designated, and occurrence frequencies of parking/stopping a vehicle, both of the frequencies being as described above, are added for each name of the target regions. The added frequencies are stored as history information.

As described above, the defined region storage device 5 stores information of a name-defined region defined for each name as a target in which a command is to be entered, information of a center position thereof, and information of an optimal display scale at which substantially the whole of the name-defined region can be displayed within one screen in most detail in association with name data accompanying map data. Note that, for a name-defined region of a conceptually specified place-name or a name-defined region of a name indicating a spot, it may be assumed that a display scale of a map image displayed immediately before a change of the map image is continued until a redefinition of the name-defined region is performed, reflecting a user's interpretation or his/her behavior pattern. Then, the defined region storage device 5 may store information about such a continuation as optimal display scale information. In such a way, in the case of displaying the map image of the name-defined region that does not always conform to the user's interpretation, the map image is displayed at the same display scale as that of the map image immediately before the map image concerned, such a problem that convenience is adversely affected by an unnecessary switch of the display scale is also effectively avoided.

Figure 5:
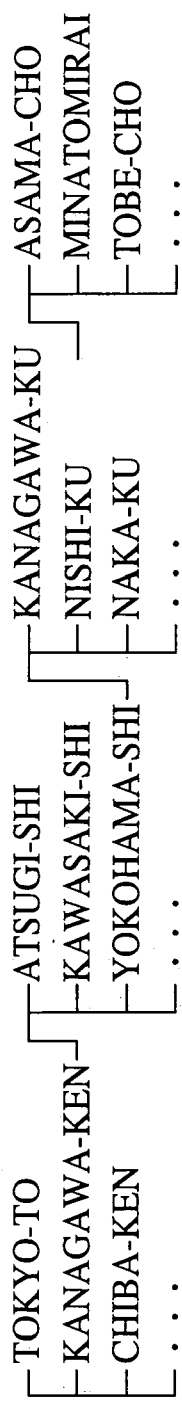
FIG. 5 is a diagram explaining a hierarchical structure of place-names.

Incidentally, the name-defined region of the place-name is regarded as an aggregate of regions that are included in the concerned name-defined region and are at lower hierarchies than that of the name-defined region. Hereinafter, such regions will be referred to as element regions. Specifically, when place-names are expressed by predetermined levels in a hierarchical structure as shown in FIG. 5, a hierarchical relationship in the structure corresponds to a relationship between the name-defined region and the element regions. Moreover, for the name-defined region of the place-name, regions that are located in the vicinity thereof and are situated in hierarchies equivalent to those of the element regions constituting the name-defined region are defined as candidate regions that can be the element regions when redefining the concerned name-defined region.

Figure 6:
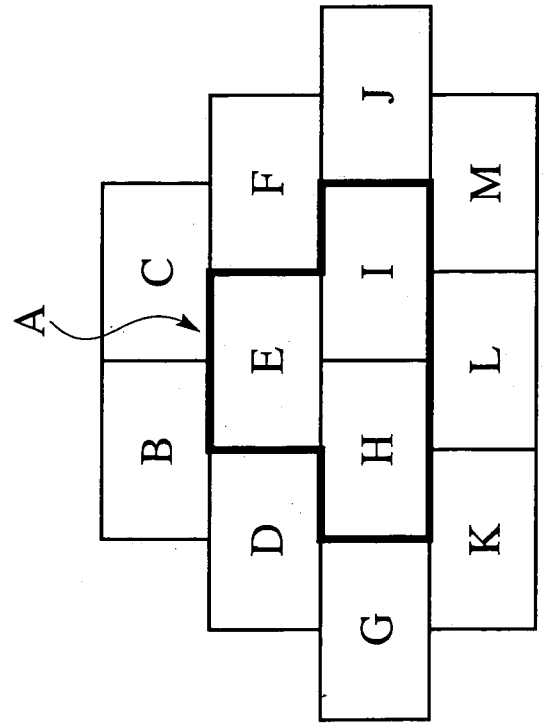
FIG. 6 explains a concept of element regions and candidate regions, showing a name-defined region A formed of element regions E, H and I.

Each of the candidate regions is defined as a region that is obtained by subtracting the element regions constituting the name-defined region from a sum aggregate of regions, each of which is adjacent to one of the element regions and in hierarchy equivalent to that of the element regions. Hereinafter, the regions in the sum aggregate will be referred to as adjacent regions. For example, the candidate regions of the name-defined region A are obtained in a manner below in the example shown in FIG. 6.

Element regions of the name-defined region
    A=region E, region H, and region I     (E1)

Adjacent regions of element region E=region B,
    region C, region D, region F, region H, and
    region I     (E2)

Adjacent regions of element region H=region D,
    region E, region G, region I, region K, and
    region L     (E3)

Adjacent regions of element region I=region E,
    region F, region H, region J, region L, and
    region M     (E4)

Hence, candidate regions of name-defined region A=(E2)$\cup$(E3)$\cup$(E4)−(E1)=region B, region C, region D, region F, region G, region J, region K, region L, and region M.

Figure 7:
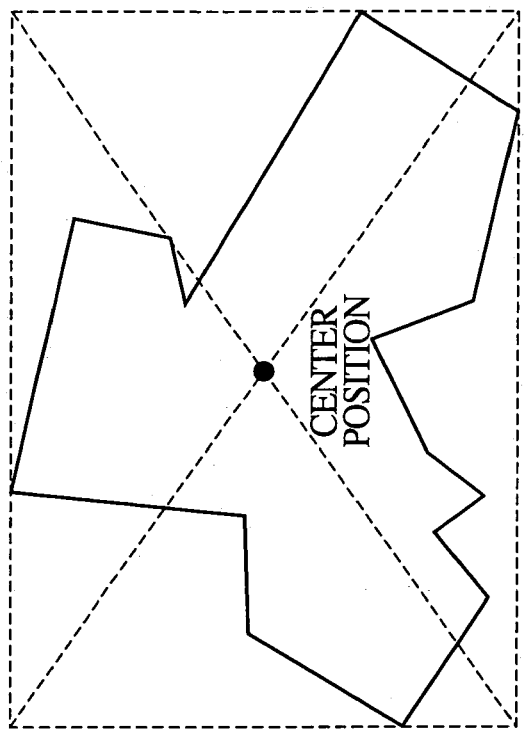
FIG. 7 explains a technique for specifying a center position of a name-defined region, in which a bold line represents a boundary of the name-defined region.

In the defined region storage device 5, information as above concerning the element regions constituting the name-defined region and the candidate regions in the periphery of the name-defined region is stored as name-defined region information defined for each place-name. Moreover, as shown in FIG. 7, a center position of a rectangular region containing the name-defined region is identified as the center position of the name-defined region when the rectangular region is obtained from the maximum and minimum degrees of latitude and the maximum and minimum degrees of longitude of the name-defined region. Then, the location information of the center position is stored in the defined region storage device 5. Moreover, a scale at which, for example, 80% or more of the above-described rectangular region containing the name-defined region is fitted in a display screen is determined as the optimal display scale of the name-defined region, and information of the optimal display scale is stored in the defined region storage device 5.

Moreover, as described above, with regard to the name indicating the spot such as a station name and an intersection name, a region of a predetermined size with the spot taken as a center is defined as the name-defined region. Therefore, region size information and information of a distance (index distance DI) from the center of the region to an outer edge are stored in the defined region storage device 5 as name-defined region information. Moreover., information about the spot that is the center position of the region and, optimal display scale information are stored in the defined region storage device 5.

These pieces of information comprising the name-defined region information, the center position information and the optimal display scale information are stored in association with name data for the name indicating the name-defined region in the defined region storage device 5. Hence, when the name data for the name in which a command is to be entered is extracted from map data of a map image determined for display, name-defined region information indicated by the name, center position information thereof and optimal display scale information can be identified, and can then be read out from the defined region storage device 5.

Then, the variety of information read out from the defined region storage device 5 will be sent to the processor 8.

The map data storage device 6 has a recording medium such as a DVD-ROM (Digital Versatile Disc-Read Only Memory) storing the map data. Here, the map data includes node data indicating points on the map, link data linking nodes, and the like, is partitioned for each data unit processible at once, and is given segment numbers and latitudinal and longitudinal data for each segment. In such a way, the map data is configured to have such a data structure as to be capable of uniquely identifying each segment. In addition to the map data as described above, name data of the placenames and the like are stored in the recording medium. The map and name data read out from the map data storage device 6 will be sent to the processor 8. Note that, when the car navigation system 1 has a function to receive data from a data server providing information by use of wireless communication, the map and name data may be acquired from the data server to be sent to the processor 8.

The display device 7 displays a map image and a variety of information based on the image data created by the processor 8. Specifically, the display device 7 includes a liquid crystal display device and the like. Note that, in the case of using a touch panel as the entry device 2, the entry device 2 and the display device 7 are configured as an integrated device.

The processor 8 performs a variety of arithmetic processing for controlling an operation of the whole of the car navigation-system 1 to which the present invention is applied. The processor 8 includes a CPU, a ROM, a RAM, a peripheral circuit of the CPU, and the like, and is configured as a microprocessor formed by interconnecting the foregoing units through buses. Then, the CPU of the processor 8 executes a variety of control programs stored in the ROM by use of the RAM as a work area, and thus the operation of the whole of the car navigation system 1 will be controlled.

Particularly, in the car navigation system 1 to which the present invention is applied, the CPU of the processor 8 executes, as one of the control programs, a map image display program stored in the ROM, thus allowing the processor 8 to realize a function as a display target determination unit 11, a function as a display image creation unit 12, a function as a operation history analysis unit 13, a function as a driving history analysis unit 14, and a function as a defined region changing unit 15. Note that the map image display program for allowing the processor 8 to realize the foregoing respective functions maybe stored in the ROM of the processor 8 in advance, or may be read out from the recording medium of the map data storage device 6 to be stored in the ROM of the processor 8. Moreover, when the car navigation system 1 has the function to receive data from the data server providing information by use of wireless communication and the like, the map image display program may be acquired from the data server to be stored in the ROM of the processor 8.

The display target determination unit 11 determines a map image to be displayed in response to the user command entered by use of the entry device 2. Specifically, the display target determination unit 11 analyzes the entered user command, which is sent through the entry device 2. Then, when the entered command instructs a change of the map image, in which a name is designated, the display target determination unit 11 reads out name-defined region information indicated by the designated name, center position information thereof and optimal display scale information from the defined region storage device. Then, based on these pieces of information, the display target determination unit 11 determines, as the map image to be displayed, a map image at the optimal display scale with the center position of the name-defined region indicated by the name designated by the user being taken as a display center. Note that, when there are no user commands entered at the times of an initial setting, a usual route guidance and the like, the display target determination unit 11 determines, as the map image to be displayed, a map image showing a periphery of a vehicle with a current location of the vehicle taken as a reference based on location information indicating a current location of the vehicle, which is detected by the vehicle location detection device 3.

The display image creation unit 12 creates a display image formed by superimposing the names in which the command is to be entered on the map image determined as the display target by the display target determination unit 11. Specifically, when the map image to be displayed is determined by the display image determination unit 11, the display image creation unit 12 acquires map data for creating the map image to be displayed and name data of the names in which the user command is to be entered from among the names included in the map image from the map data storage device 6. Then, the display image creation unit 12 processes these data and creates image data of the display image displaying the name on the map image in a superimposed manner. The image data of the display image, which has been created by the display image creation unit 12, is sent to the display device 7. Then, using the image data of the display image, the display device 7 performs an operation to display the map image showing substantially the whole of the name-defined region indicated by the name designated by the user will be displayed on the display device 7 together with the names in which the command is to be entered.

The operation history analysis unit 13 analyzes an operation history where the user utilizes the entry device 2 and allowing the history information storage device 4 to store information effective for redefining the name-defined region as history information. As described above, the effective information is, for example, operation frequency information of an operation performed by designating a certain name in a map image or a name in the vicinity thereof, in a state where the map image is displayed in response to an entered command to change a map image, in which the name is designated.

Moreover, the driving history analysis unit 14 analyzes a driving history of a vehicle on which the car navigation system 1 is mounted and allowing the history information storage device 4 to store information effective for redefining the name-defined region as history information. As described above, the effective information is, for example, occurrence frequency information of parking/stopping the vehicle.

The defined region changing unit 15 redefines a name-defined region of a specific name according to needs based on the history information stored in the history information storage device 4 and rewriting the variety of information concerning the name-defined region, which has been stored in the defined region storage device 5. Note that specific processing contents of the foregoing accumulation of the history information by the operation history analysis unit 13 and the driving history analysis unit 14 and a specific processing content of the foregoing redefinition of the name-defined region based on the history information by the defined region changing unit 15 will be described later in detail.

Figure 8:
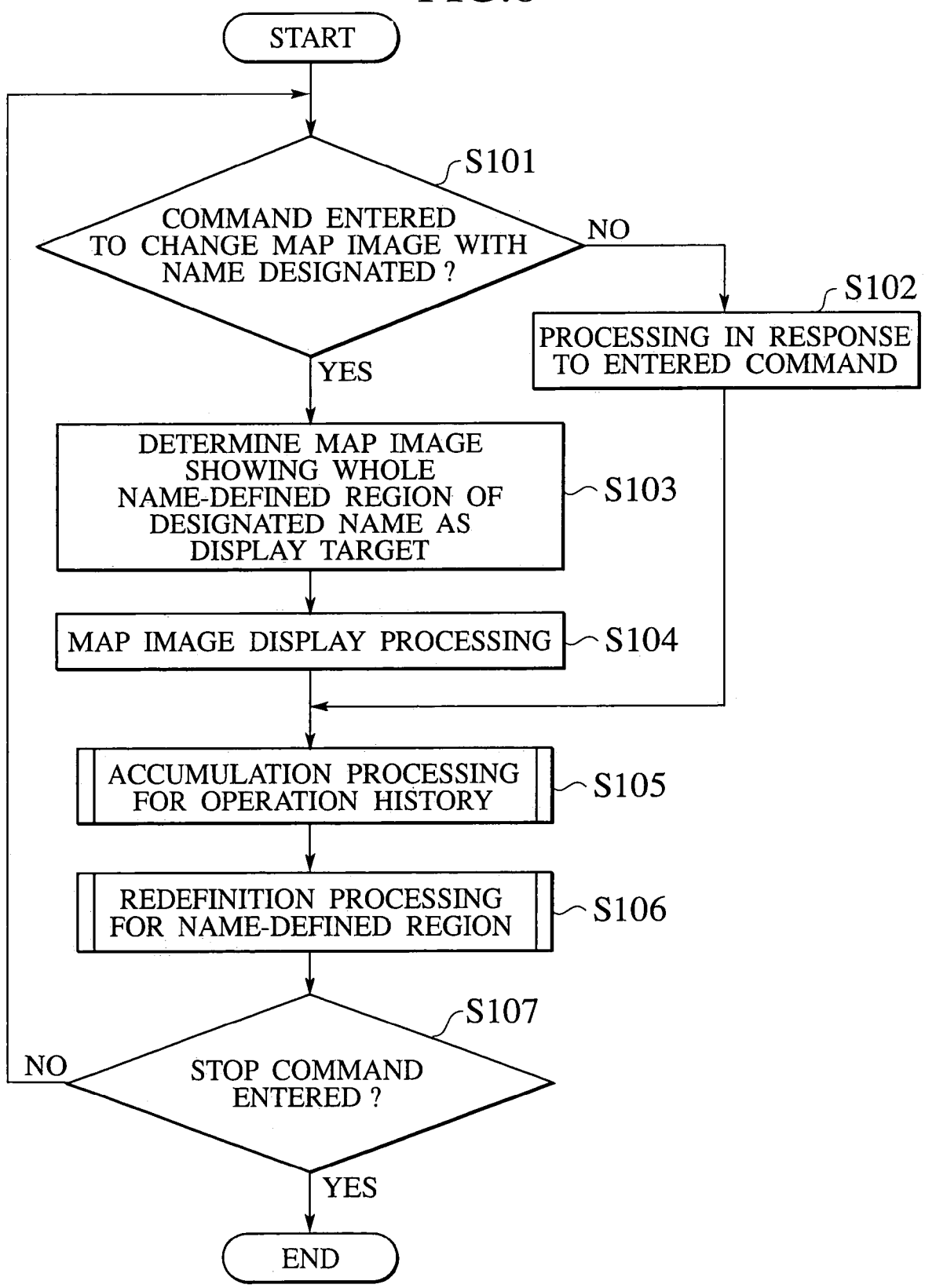
FIG. 8 is a flowchart showing an example of processing for changing a map image to be displayed, in response to an entry of a command by a user in the car navigation system.

Next, processing for changing the map image to be displayed in response to an entered user command in the car navigation system 1 configured as described above will be described with reference to the flowchart of FIG. 8.

First, when a command by the voice of the user and the like is entered by the entry device 2, the entered command is analyzed by the display target determination unit 11 of the processor 8, the entered command is analyzed, and it is determined whether or not the entered command instructs a change of the map image, in which a name is designated (Step S101). Here, for example, when the entered user command instructs processing other than a change of the map image, such as a setting of a destination and/or a route to be explored or a registration of a spot, processing such as a setting of a destination and/or a route or a registration of a spot is performed accordingly (Step S102).

On the other hand, when the entered user command instructs a change of the map image, in which a name is designated, next, the name-defined region information of the name designated by the user, the center position information thereof and the optimal display scale information are read out from the defined region storage device 5 by the display target determination unit 11. Based on these pieces of information, processing for determining the map image to be displayed is performed. Consequently, the map image showing substantially the whole of the name-defined region of the name designated by the user in detail is determined as the map image to be displayed (Step S103).

When the map image to be displayed is determined, the image data of the map image, the required name data and the like are read out from the map data storage device 6 by the display image creation unit 12. Then, these data are processed to create the image data of the map image. Then, the display device 7 performs the display operation based on the image data, and the map image showing substantially the whole of the name-defined region of the name designated by the user in detail is displayed on the display device 7 (Step S104).

When processing such as the change of a map image and the setting of a destination and/or the route or the registration of a spot is performed, in some cases, the entered user commands for such processing (operation for the car navigation system 1) can provide material for determining the user's interpretation of the name. Therefore, when such an operation is performed, the foregoing information is accumulated as history information in the history information storage device 4 in its accumulation processing for the operation history in Step S105. Then, the name-defined region of the concerned name is redefined in a mode reflecting the user's interpretation thereof in redefinition processing for the name-defined region in Step S106 based on the history information accumulated in the history information storage device 4 as necessary.

While a series of processings as described above is being performed, the user commands, which are entered by use of the entry device 2, are constantly monitored by the processor 8. Then, it is determined by the processor 8 whether or not a command to stop the car navigation system 1 has been entered (Step S107). When the command to stop the car navigation system 1 has not been entered, the foregoing series of processings is repeated. On the other hand, when the command to stop the car navigation system 1 has been entered, processing for stopping the car navigation system 1 is performed, and then the series of processings is ended.

Next, processing for accumulating history information indicating the operation history of the user and the driving history of the vehicle and processing for redefining the name-defined region based on these pieces of history information will be described in detail while giving specific examples.

Note that, in the description below, a place-name of an administrative district such as, for example, "Yokohama-shi" and "Nishi-ku", which designates an objectively defined region, will be referred to as a definition-fixed name. Moreover, a conceptually specified place-name such as, for example, "Yokohama" and "Shonan", and a name indicating a non-domain spot, name-defined regions of which are subjectively defined, will be referred to as definition-varied names. Thus, only for the definition-varied names, will the name-defined regions be redefined according to needs.

However, even if a place-name corresponds to a definition-varied name, if the place of the name is far from a pre-registered spot such as a house of the user, the name-defined region thereof is not always redefined appropriately based on the history information because the user does not recognize or know the place very well. Therefore, such a name may not be redefined, or alternatively, the redefinition thereof may not be started until sufficient history information is accumulated. Moreover, even if a place-name corresponds to a definition-fixed name, if it is determined that the user assumes a partial zone within the name defined region thereof or a zone out of the name-defined region as a region indicated by the name, the name-defined region may be redefined in a mode reflecting the user's interpretation thereof and his/her behavior pattern according to needs.

In this embodiment, first, with regard to the name indicating a predetermined region, such as a place-name, the following three actions of (1) to (3) are set as actions serving as occasions for redefining the name-defined region of the definition-varied name (hereinafter, referred to as definition-affecting actions). The number of implementation times of the definition-affecting actions (frequencies of the actions) is counted for each name-defined region, and for each of the foregoing element regions included in the name-defined region of the definition-Varied name and each candidate region in the periphery of the element region. Then, the counted numbers of implementation times are stored as history information in the history information storage device 4. Then, the numbers of implementation times of the definition-affecting actions, which have been stored as history information, are compared among the element regions and the candidate regions, thus determining whether or not the name-defined region of the definition-varied name is to be redefined.

(1) Action by a user, after designating a certain definition-varied name A to display a map image of a name-defined region thereof, of subsequently further designating an element or candidate region of the name-defined region to display a map image of the element or candidate region.

(2) Action by a user, after designating a certain definition-varied name A to display a map image of a name-defined region thereof, of subsequently performing an operation such as setting of a destination and/or a route or registration of a spot, for a spot in an element or candidate region of the name-defined region.

(3) Action by a user of parking/stopping a vehicle in an element region included in a name-defined region of a certain definition-varied name A or in a candidate region in the periphery of the element regions.

A specific example will be given. It is first assumed that the name-defined region of the definition-varied name "Yokohama" is defined as a region combining the element regions thereof "Naka-ku", "Nishi-ku" and "Minami-ku", and that the candidate regions thereof are "Kanagawa-ku", "Hodogaya-ku", "Totsuka-ku", "Konan-ku" and "Isogo-ku". In this case, with regard to the definition-varied name "Yokohama", every time when the foregoing definition-affecting actions (1) to (3) are performed in each of the element and candidate regions described above, the number of implementation times of the actions is counted by the operation history analysis unit 13 or the driving history analysis unit 14. Then, the counted number is stored as history information in the history information storage device 4. Consequently, the history information will be stored in the history information storage device 4 in a storage mode as shown in FIG. 9.

Meanwhile, with regard to a name indicating a spot, such as a station name and an intersection name, the following two actions of (4) and (5) are set as definition-affecting actions serving as occasions for redefining the name-defined region thereof. The number of implementation times of the definition-affecting actions (frequencies of the actions) is counted for each category of distances (hereinafter, referred to as implementation distances) between target spots of the definition-affecting actions and the center position of the name-defined region. In this case, the target spots are spots where the destinations and/or the routes are set, spots where the spot registration is performed, or spots where the vehicle is parked/stopped. Then, the counted numbers of implementation times are stored as history information in the history information storage device 4. Then, the numbers of implementation times of the definition-affecting actions, which have been stored as history information, are compared among the categories, thus determining whether or not the name-defined region is to be redefined. Note that, though it is possible to set each category of the implementation distances in an arbitrary distance range, it is desirable to set the category so as to coincide with a category of display scale preset in the car navigation system 1 for the sake of convenience in redefining the name-defined region.

(4) Action by a user, after designating a name B of a certain spot to display a map image of a name-defined region thereof, of performing an operation such as setting of a destination and/or a route or registration of a spot, for a spot within a predetermined effective distance from a center position of the name-defined region without performing an operation such as changing the map image and scrolling the screen (scale changing operation is allowable).

(5) Action by a user, in a state where the user performs setting of a destination and/or a route or registration of a spot, particularly for a spot indicated by a name B, of parking/stopping a vehicle at a spot within a preset effective distance from a center position of a name-defined region of a name B.

As described above, the scale changing operation is allowed to be interposed in the foregoing action (4), because the user is considered not to pay so much attention to a scale changing operation unlike to an operation such as changing the map image and scrolling the screen. Moreover, the foregoing action (5) is particularly limited to the case of performing the setting of the destination and/or the route or the registration of the spot for the spot indicated by the name B, because the user is considered to pay concentrated attention to the name B. However, these only show a specific example of the actions regarded as definition-affecting actions, and definition-affecting actions are not limited to the foregoing actions.

The specific example will be given below. It is assumed that categories of the implementation distances are set for the name of "Yokohama station" as: "100 m and below"; "over 100 m to 500 m"; "over 500 m to 1 km"; "over 1 km to 2.5 km"; "over 2.5 km to 5 km"; and "over 5 km to 10 km", and that the effective distance is set to 100 m. In this case, with regard to the name of "Yokohama station", implementation distances in the foregoing actions (4) and (5) are calculated every time when such definition-affecting actions are performed. Then, the number of implementation times of the actions is counted for each category of the implementation distances by the operation history analysis unit 13 or the driving history analysis unit 14, and the counted number is stored as history information in the history information storage device 4. Consequently, the history information will be stored in the history information storage device 4 in a storage mode as shown in FIG. 10.

Here, a flow of the processings for counting the number of implantation times of the definition-affecting actions as described above and accumulating the counted number as history information will be specifically described.

Figure 11:
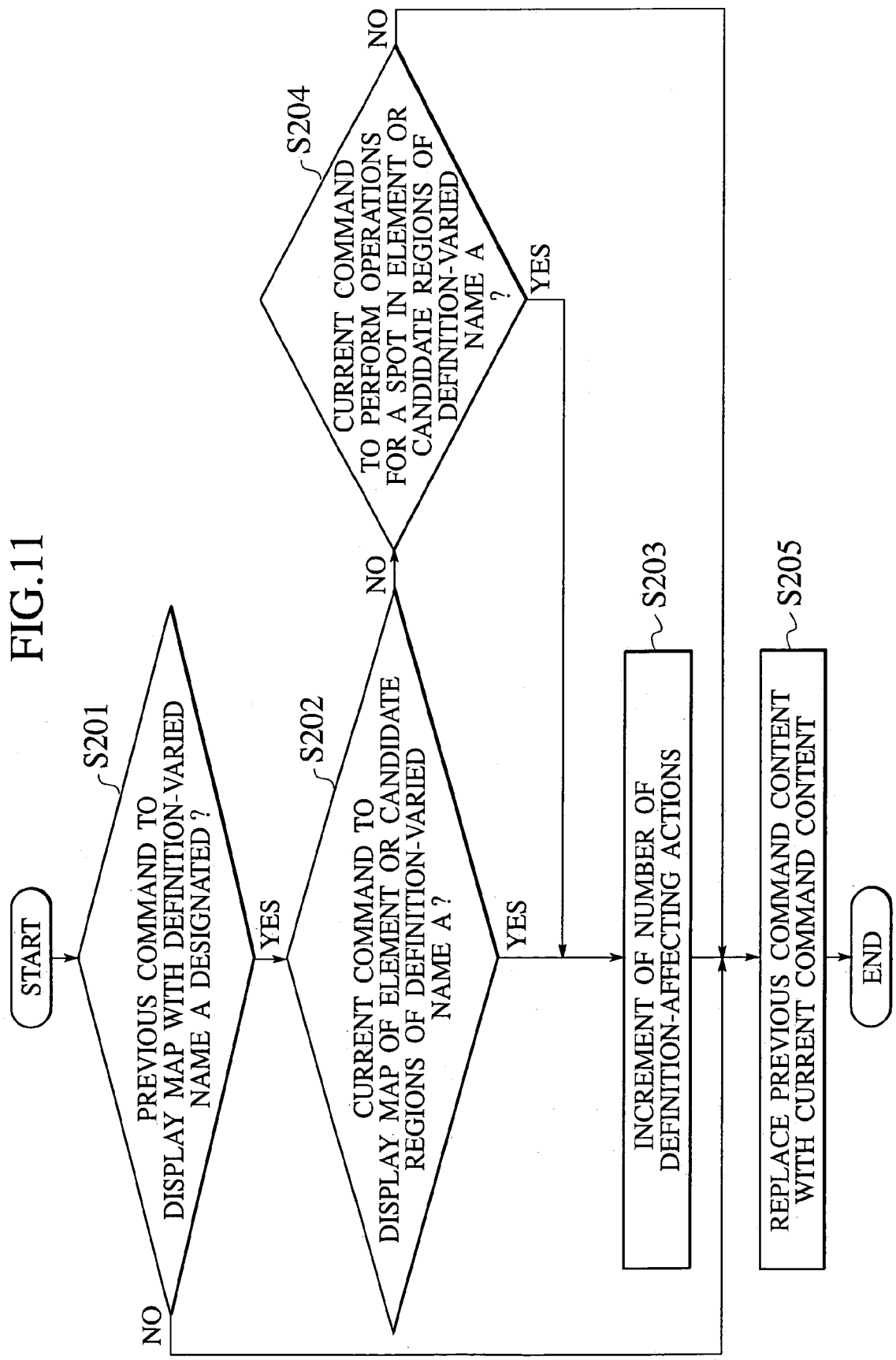
FIG. 11 is a flowchart showing an example of processing for accumulating history information indicating an operation history of the car navigation system, the processing being performed in the car navigation system.

First, processing for the definition-affecting actions of the foregoing (1) and (2) will be described with reference to the flowchart of FIG. 11. This processing is implemented as the accumulation processing for the operation history in Step S105 of the flowchart shown in FIG. 8. Note that it is premised that a content of a previously entered user command is stored when performing this accumulation processing for the operation history.

First, in Step S201, it is determined whether or not the previously entered user command instructs a display of a map image, in which the definition-varied name A is designated. Then, when the previously entered user command instructs the display of the map image, in which the definition-varied name A is designated, the processing proceeds to Step S202. In Step S202, it is determined whether or not the entered user command this time is a command to display a map image of the element or candidate region of the name-defined region A.

Here, when the previously entered user command instructs the display of the map image, in which the definition-varied name A is designated, and when the command entered this time instructs the display of the map image of the element or candidate region of the name-defined region A (definition-varied name A), such an entry action this time is counted as a definition-affecting action for the definition-varied name A. Then, the number of implementation times corresponding to the designated element or candidate region is incrementally added in history information stored in the storage mode as shown in FIG. 9 (Step S203).

On the other hand, when the command entered this time is not a command to display the map image of the element or candidate region of the name-defined region A, the processing proceeds to Step S204. In Step S204, it is determined whether or not the entered command is a command to perform the setting of the destination and/or the route or the registration of the spot, for a spot in the element or candidate region of the name-defined region A. Then, when the previously entered user command instructs the display of the map image, in which the definition-varied name A is designated, and when the command entered this time is a command to perform the setting of the destination and/or the route or the registration of the spot, for the spot in the element or candidate region of the name-defined region A, similarly, such an entry action this time is counted as the definition-affecting action for the definition-varied name A in Step S203. Then, the number of implementation times corresponding to the designated element or candidate region is incrementally added.

Then, after accumulating history information as described above, the content of the previously entered user command is replaced by the content of the command entered this time (Step S205), and the processing is ended. Note that, when it is determined in Step S201 that the previously entered command does not instruct the display of the map image, in which the definition-varied name A is designated, and when it is determined in Step S204 that the command entered this time is not a command to display the map image of the element or candidate region of the name-defined region A or the command to perform the setting of the destination and/or the route or the registration of the spot, for the spot in the element or candidate region of the name-defined region A, the processing proceeds to Step S205 without the accumulation of history information as described above. Then, in Step S205, the content of the previously entered user command is replaced by the content of the command entered this time, and the processing is ended.

Figure 12:
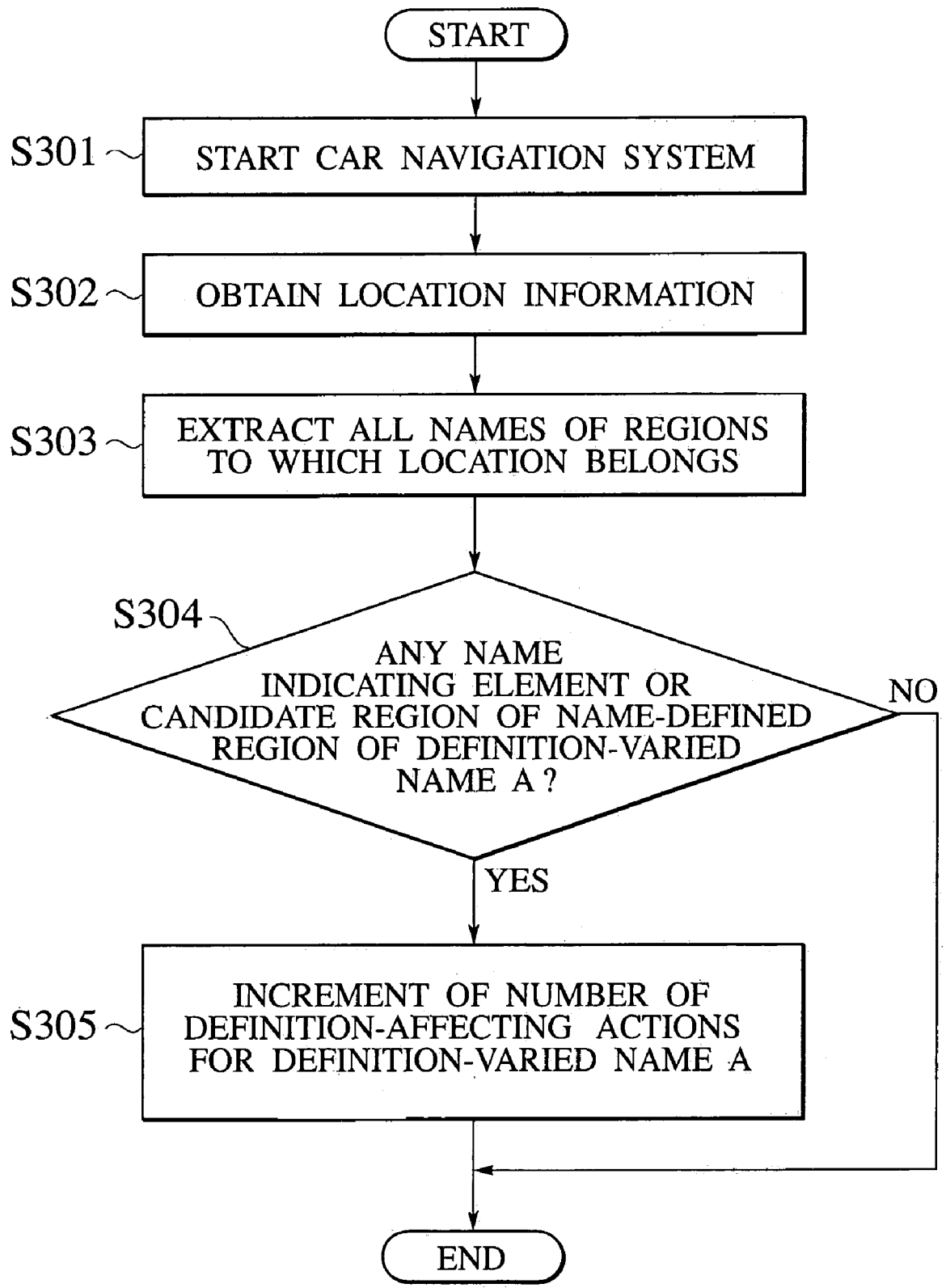
FIG. 12 is a flowchart showing an example of the processing for accumulating history information indicating a driving history of a vehicle in the car navigation system.

Next, processing for the definition-affecting action of the foregoing (3) will be described with reference to the flowchart of FIG. 12. This processing is implemented at the time of starting the car navigation system 1.

When the car navigation system 1 is started (Step S301), a location (current location) of the vehicle at the starting time is determined as a location where the vehicle is parked/stopped, and location information indicating the current location is acquired from the vehicle location detection device 3 (Step S302). Then, all names of regions to which the current location belongs are extracted from the respective hierarchies (Step S303). Specifically, when the location where the car navigation system 1 is started is, for example, within Takara-cho, Kanagawa-ku, Yokohama-shi, Kanagawa-ken, all the names of "Takara-cho", "Kanagawa-ku", "Yokohama-shi", "Kanagawa-ken" are extracted.

Next, it is determined whether or not the extracted names includes a name indicating the element or candidate region of the name-defined region of the certain definition-varied name A (Step S304). Then, when the name indicating the element or candidate region of the name-defined region of the definition-varied name A is included, an action of parking/stopping the vehicle is counted as a definition-affecting action for the definition-varied name A, and the number of implementation times corresponding to the concerned element or candidate region is incrementally added (Step S305).

Figure 13:
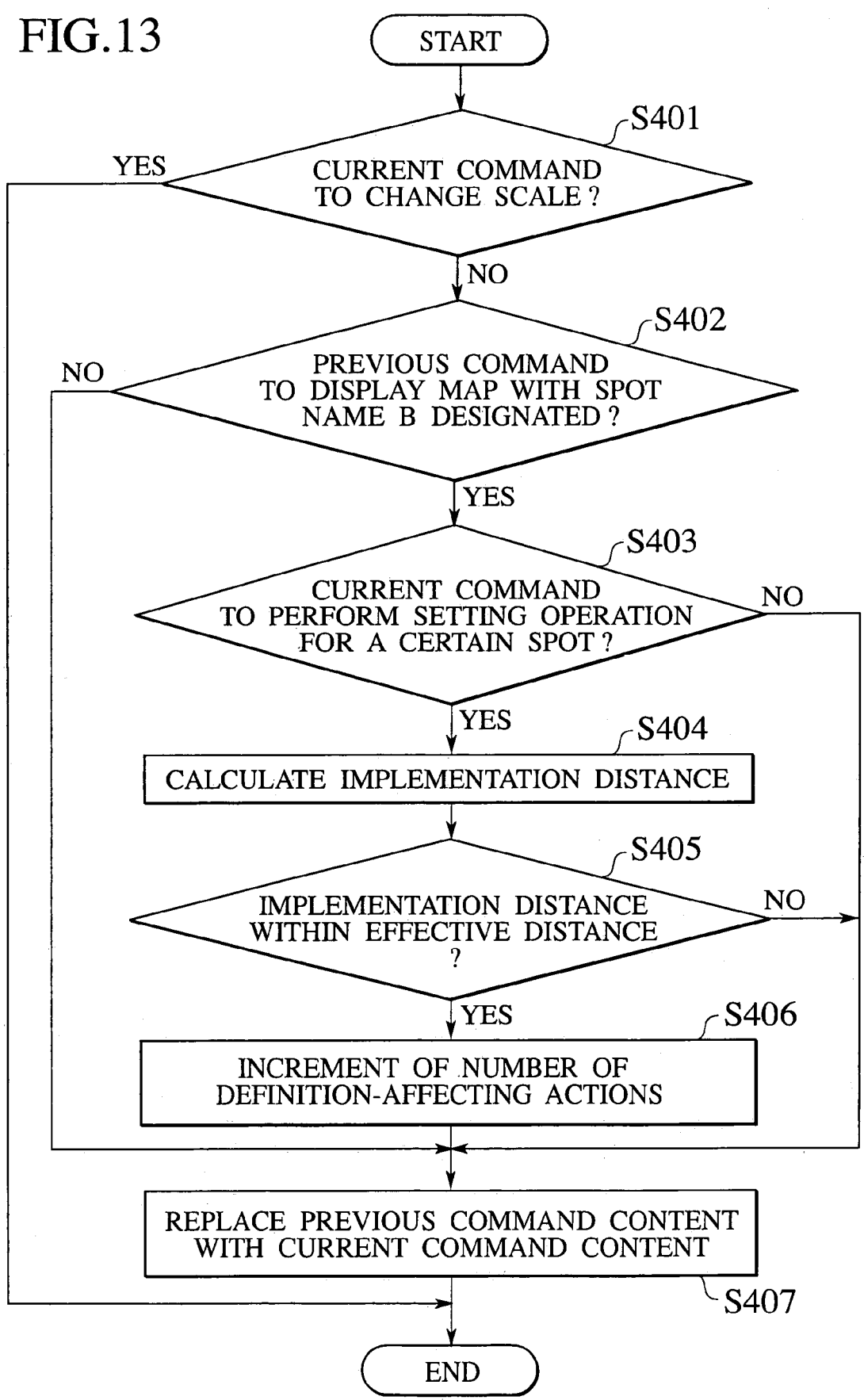
FIG. 13 is a flowchart showing another example of the processing for accumulating the history information indicating the operation history of the car navigation system, the processing being performed in the car navigation system.

Next, processing for the definition-affecting action of the foregoing (4) will be described with reference to the flowchart of FIG. 13. This processing is implemented as the accumulation processing for the operation history in Step S105 of the flowchart shown in FIG. 8. Note that it is premised that the content of the previously entered user command is stored when performing this accumulation processing for the operation history.

First, in Step S401, it is determined whether or not the user command entered this time instructs a scale change of a map image being displayed. Then, when the command entered this time instructs a scale change, the processing is ended, leaving the content of the previously entered user command maintained.

On the other hand, when the command entered this time does not instructs a scale change of the map image, next, it is determined in Step S402 whether or not the previously entered user command instructs a display of a map image, in which the spot name B is designated. Then, when the previously entered user command instructs the display of the map image, in which the spot name B is designated, next, it is determined in Step S403 whether or not the user command entered this time is a command to perform, for a certain spot, the setting of the destination and/or the route, the registration of the spot, and the like.

Here, when the previously entered user command instructs the display of the map image, in which the spot name B is designated, and when the command entered this time is a command to perform, for the certain spot, the setting of the destination and/or the route, the registration of the spot, and the like in a state where the map image with the name B taken as a display center is displayed, next, in Step S404, a distance (implementation distance) between the center position of the name-defined region (spot indicated by the name B) and a spot serving as a target of the setting of the destination and/or the route, the registration of the spot, and like is calculated. Then, in Step S405, it is determined whether or not the calculated implementation distance is within the effective distance.

Then, when the implementation distance is within the effective distance, the number of implementation times of an action in a distance category corresponding to the implementation distance in history information stored in the storage mode as shown in FIG. 10 is incrementally added (Step S406). Then, after history information is accumulated as described above, the content of the previously entered user command is replaced by the content of the command entered this time (Step S407), and the processing is ended. Note that, when it is determined in Step S402 that the previously entered user command does not instructs the display of the map image, in which the spot name B is designated, when it is determined in Step S403 that the user command entered this time is not a command to perform, for the certain spot, the setting of the destination and/or the route, the registration of the spot, and the like, and when it is determined in Step S405 that the implementation distance is not within the effective distance, the processing proceeds to Step S407 without performing the accumulation of history information described above. Then, in Step S407, the content of the previously entered user command is replaced by the content of the command entered this time, and the processing is ended.

Next, processing for the definition-affecting action of the foregoing (5) will be described with reference to the flowchart of FIG. 14. This processing is implemented at the time of starting the car navigation system 1.

When the car navigation system 1 is started (Step S501), a location (current location) of the vehicle at the starting time is determined as a location where the vehicle is parked/stopped, and location information indicating the current location is acquired from the vehicle location detection device 3 (Step S502). Then, all names of spots set as the destinations or the routes and of spots for which the spot registration has been performed are extracted (Step S503).

Next, it is determined whether or not a name coinciding with a spot name B defined as a name-defined region is present among the respective extracted names (Step S504). Then, when a name coinciding with the spot name B defined as the name-defined region is present, an action of parking/stopping the vehicle is counted as a definition-affecting action for the name B, and a distance (implementation distance) between the spot indicated by the name B and the location where the vehicle is parked/stopped is calculated (Step S505). Then, with regard to the name B, the number of implementation times in a distance category corresponding to the calculated implementation distance is incrementally added (Step S506).

In the car navigation system 1 of this embodiment, history information continues to be accumulated in a manner as described above. Then, at a stage where history information sufficient for identifying, to some extent., the user's interpretation of the definition-varied name A and his/her behavior pattern comes to be accumulated, the name-defined region of the definition-varied name A and the name-defined region of the spot name B are redefined according to needs based on the accumulated history information.

The redefinition of the name-defined region of the definition-varied name A is realized by changing the combination of the element regions and the candidate regions in a manner described below. First, for each of the element regions in the name-defined region and the candidate regions in the periphery of the name-defined region, the number of implementation times (frequencies of the actions) of the definition-affecting actions performed in each of the regions is compared with those of the others. Then, an element region in which the number of implementation times of the definition-affecting action is extremely small is excluded from the name-defined region, or a candidate region in which the number of implementation times of the definition-affecting action is extremely large is added to the name-defined region.

Figure 15B:
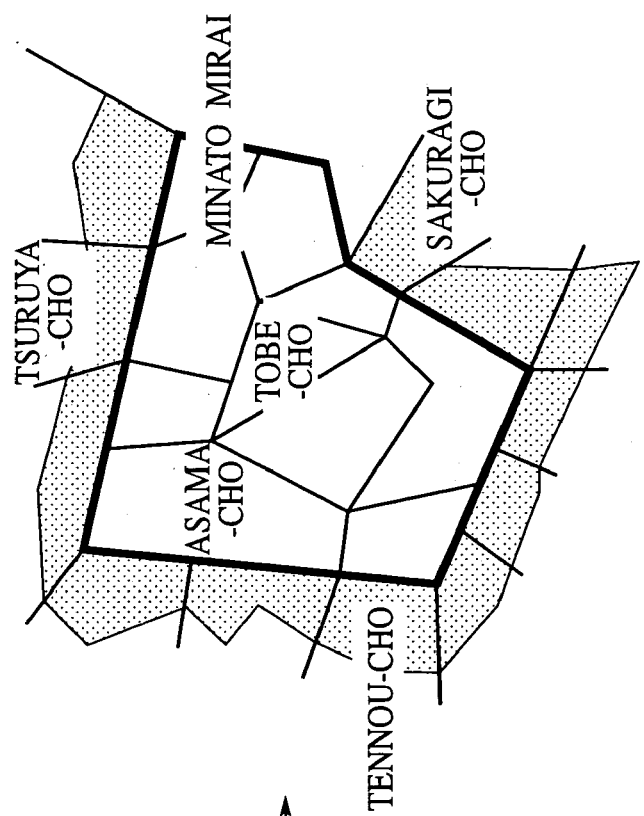
Figure 15A:
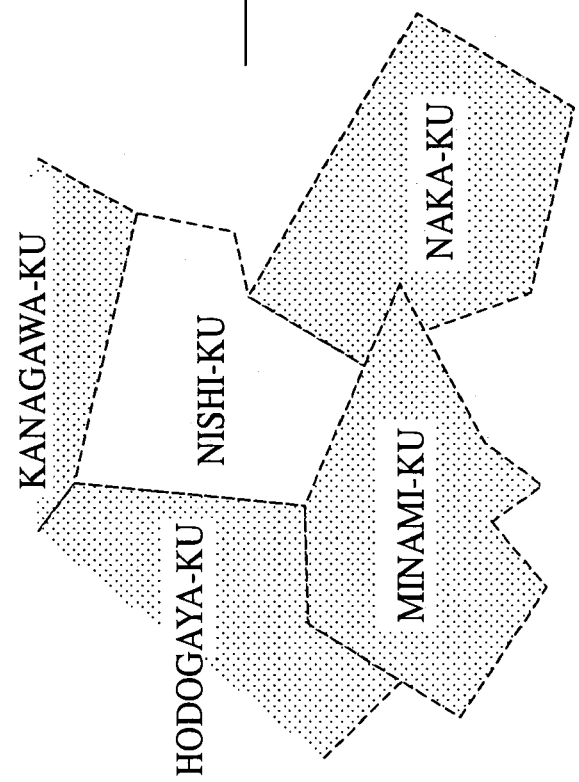

In this case, when each of the element and candidate regions in the name-defined region further includes regions in a hierarchy lower than that of the concerned regions, that is, when each of the element and candidate regions is an aggregate of the regions in the lower hierarchy, the name-defined region of the definition-varied name A may be redefined in such a manner that each of the element and candidate regions is replaced by the regions in the lower hierarchy, and that the combination of these regions is changed. A specific example will be given below. For example, as shown in FIG. 15A, when the element region of the definition-varied name "Yokohama" is only "Nishi-ku", and when the candidate regions thereof are "Kanagawa-ku", "Hodogaya-ku", "Naka-ku" and "Minami-ku", these element and candidate regions are replaced by regions in the lower hierarchy. Specifically, as shown in FIG. 15B, such lower-hierarchical regions including "Minato-mirai", "Sengen-cho", "Tobe-cho" and the like, which are included in the element region "Nishi-ku", are defined as the element regions of the definition-varied name "Yokohama". Moreover, the lower-hierarchical region "Tsuruya-cho" included in the candidate region "kanagawa-ku", the lower-hierarchical region "Tennou-cho" included in the candidate region "Hodogaya-ku", the lower-hierarchical region "Sakuragi-cho" included in the candidate region "Naka-ku", and the like, are defined as the candidate regions of the definition-varied name "Yokohama". Then, by changing the combination of the regions replaced by these element or candidate regions, the name-defined region of the definition-varied name "Yokohama" is redefined.

As described above, when the name-defined region of the definition-varied name A is redefined, the element and candidate regions thereof are replaced by the lower-hierarchical regions, and the combination of these regions is changed, thus redefining the name-defined region of the definition-varied name A. In such a way, it is possible to analyze the user's interpretation of the definition-varied name A in more detail and to redefine the name defined-region of the definition-varied name A in a mode reflecting the user's interpretation more faithfully.

When the name-defined region of the definition-varied name A is redefined, the name-defined region information of the definition-varied name A (information concerning the element regions and the candidate regions), which is stored in the defined region storage device 5, the center position information of the name-defined region, and the optimal display scale information, are rewritten into information in response to the newly defined name-defined region. Thus, when a command to change the map image, in which the definition-varied name A is designated, is entered on and after, the rewritten information is read out from the defined region storage device 5. Then, the map image to be displayed is determined based on these pieces of information, and the map image showing substantially the whole of the newly defined name-defined region will be displayed on the display device 7. Moreover, simultaneously therewith, a portion concerning the definition-varied name A in history information stored in the history information storage device 4 is rewritten so as to correspond to the newly defined name-defined region.

Meanwhile, the redefinition of the name-defined region of the spot name B is realized in a manner described below. First, the number of implementation times of the definition-affecting actions (frequencies of actions) performed in the name-defined region or spots in the periphery thereof are compared for each category of the implementation distances. Then, the size of the name-defined region is changed so as to include only spots corresponding to a distance category where the number of implementation times of the definition-affecting actions is large. Specifically, the redefinition is realized by increasing/decreasing the distance (index distance DI) from the center of the name-defined region to the outer edge thereof.

Then, when the name-defined region of the spot name B is redefined, the information of the index distance DI of the name defied region, which is stored in the defined region storage device 5, and the optimal display scale information are rewritten into information in response to the newly defined name-defined region. Thus, when a command to change the map image, in which the spot name B is designated, is entered on and after, the rewritten information is read out from the defined region storage device 5. Then, based on these pieces of information, the map image to be displayed is determined, and the map image showing substantially the whole of the newly defined name-defined region will be displayed on the display device 7. Moreover, simultaneously therewith, a portion concerning the name B in history information stored in the history information storage device 4 is rewritten so as to correspond to the newly defined name-defined region.

Figure 16:
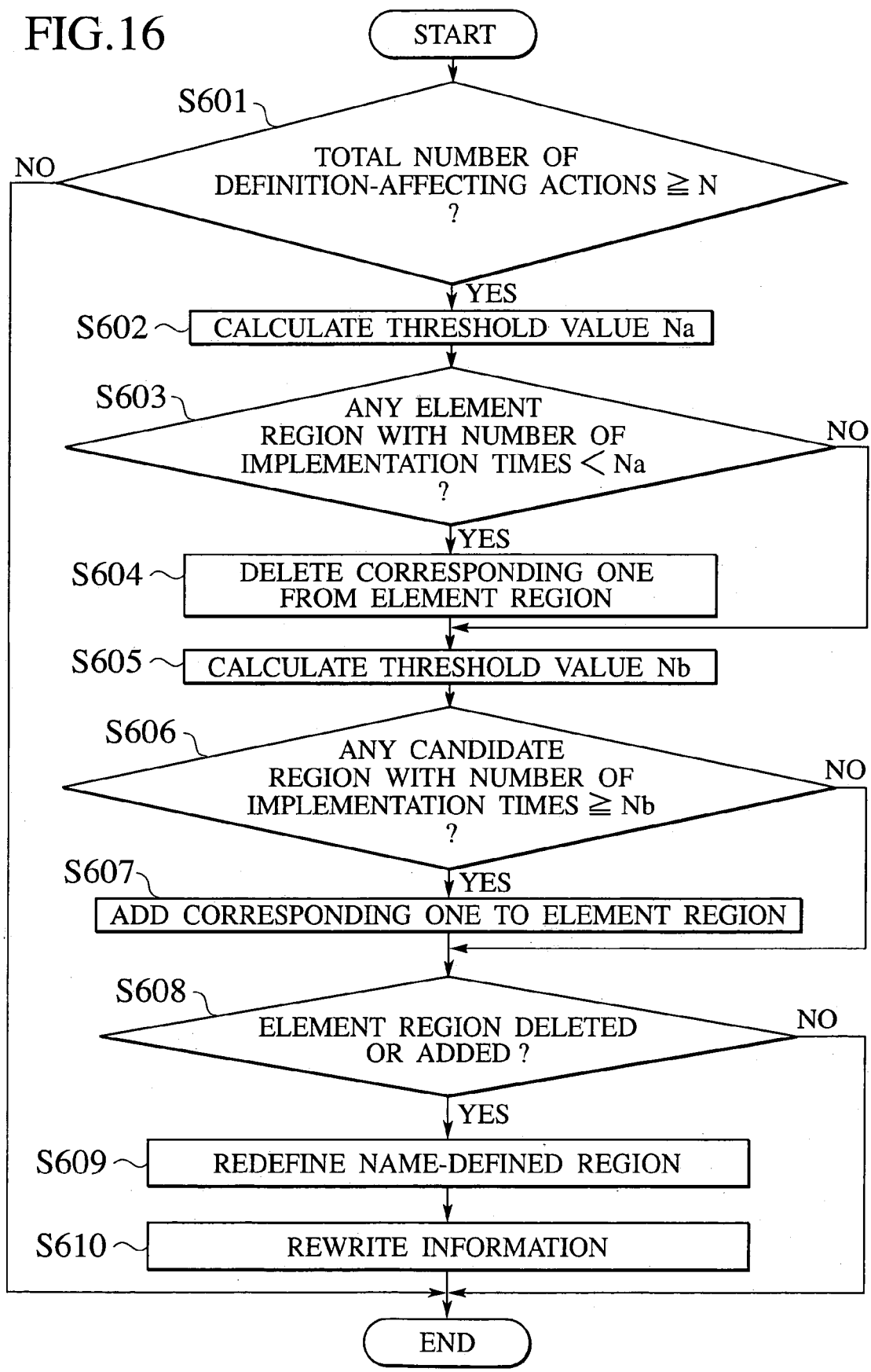
FIG. 16 is a flowchart showing an example of processing for redefining the name-defined regions based on the history information in the car navigation system.

Here, a flow of processing for redefining the name-defined region of the definition-varied name A will be specifically described with reference to the flowchart of FIG. 16 by taking, as an example, the case where history information as shown in FIG. 9 is stored in the history information storage device 4. This processing is implemented as the redefinition processing for the name-defined region in Step S106 of the flowchart shown in FIG. 8.

First, it is determined whether or not a sum total of the numbers of implementation times of the definition-affecting actions, which have been stored as history information concerning the definition-varied name A, is equal to or larger than a predetermined threshold value N (Step S601). Only when the sum total of the numbers of implementation times of the definition-affecting actions is equal to or larger than the threshold value N, will the processing that follows be implemented. Specifically, when history information is not accumulated sufficiently, and when the sum total of the numbers of implementation times of the definition-affecting actions concerning the definition-varied name A is small, it is difficult to analyze the user's interpretation of the definition-varied name A based on this history information.

Hence, in such a case, the processing for redefining the name-defined region of the definition-varied name A will not be performed.

Specifically, for example, if the threshold value N is set at 50 when the history information shown in FIG. 9 is stored as history information concerning the definition-varied name "Yokohama", the sum total of the number of implementation times of the definition-affecting actions concerning the definition-varied name "Yokohama" is 58 that is equal to or larger than the threshold value N. Therefore, the definition-varied name "Yokohama" is to be subjected to the processing for redefining the name-defined region.

When it is determined that the sum total of the number of implementation times of the definition-affecting actions concerning the definition-varied name A is equal to or larger than the threshold value N, next, a threshold value Na is calculated. The threshold value Na serves as a criterion according to which a region where the number of implementation times of the definition-affecting actions is small is deleted from among the element regions of the name-defined region of the definition-varied name A (Step S602). For example, this threshold value Na is calculated by obtaining a mean value of the numbers of implementation times of the definition-affecting actions in the respective element regions and multiplying the obtained mean value of the numbers of implementation times by a predetermined ratio. Then, it is determined whether or not an element region where the number of implementation times of the definition-affecting actions is smaller than the threshold value Na calculated in Step S602 is present among the element regions of the name-defined region of the definition-varied name A (Step S603). Consequently, the element region where the number of implementation times of the definition-affecting actions is smaller than the threshold value Na is deleted from among the element regions of the name-defined region of the definition-varied name A (Step S604)

In the foregoing specific example, the element regions of the name defined region of the definition-varied name "Yokohama" are "Naka-ku", "Nishi-ku" and "Minami-ku". The sum total of the numbers of implementation times of the definition-affecting actions in these element regions is 39, and the mean value thereof is 13. Then, assuming that the predetermined ratio is 0.3, the threshold value Na becomes 3.9. Hence, "Minami-ku" where the number of implementation times of the definition-affecting actions is smaller than 3.9 will be deleted from among the element regions "Naka-ku", "Nishi-ku" and "Minami-ku".

Next, a threshold value Nb is calculated, which serves as a criterion according to which a region where the number of implementation times of the definition-affecting actions is large is added to the element regions from among the candidate regions of the name-defined region of the definition-varied name A (Step S605). For example, this threshold value Nb is set at the number of implementation times in an element region where the number of implementation times of the definition-affecting actions is the smallest among element regions that have not been deleted in Step S604. Then, it is determined whether or not a candidate region where the number of implementation times of the definition-affecting actions is equal to or larger than the threshold value Nb calculated in Step S605 is present among the candidate regions of the name-defined region of the definition-varied name A (Step S606). Consequently, the candidate region where the number of implementation times of the definition-affecting actions is equal to or larger than the threshold value Nb is added to the element regions of the name-defined region of the definition-varied name A (Step S607).

In the foregoing specific example, the element regions remaining without being deleted are "Naka-ku" and ""Nishi-ku". The numbers of implementation times of the definition-affecting actions of "Naka-ku" and "Nishi-ku" are 14 and 23, respectively. Hence, the threshold value Nb becomes 14. Moreover, the candidate regions of the name-defined region of the definition-varied name "Yokohama" are "Kanagawa-ku", "Hodogaya-ku", "Totsuka-ku", "Konan-ku" and "Isogo-ku". The numbers of implementation times of the definition-affecting actions of "Kanagawa-ku", "Hodogaya-ku", "Totsuka-ku", "Konan-ku" and "Isogo-ku" are 18, 0, 0, 0 and 1, respectively. Hence, among these candidate regions "Kanagawa-ku", "Hodogaya-ku", "Totsuka-ku", "Konan-ku" and "Isogo-ku", it is "Kanagawa-ku" where the number of implementation times of the definition-affecting actions is equal to or larger than 14 that will be added to the element regions.

Next, it is determined whether or not the element regions have been deleted and/or added in the above processing (Step S608). When the element regions have been deleted and/or added, the name-defined region of the definition-varied name A is redefined accordingly (Step S609). Specifically, an aggregate of the newly combined element regions is defined as the name-defined region of the definition-varied name A, and regions obtained by subtracting the element regions from a sum aggregate of regions adjacent to the newly combined element regions are defined as new candidate regions.

In the foregoing specific example, "Minami-ku" is deleted from among the original element regions, and "Kanagawa-ku" is added. Therefore, the name-defined region of the definition-varied name "Yokohama" is redefined as the aggregate of the element regions "Naka-ku", "Nishi-ku" and "Kanagawa-ku". Then, "Tsurumi-ku", "Kohoku-ku", "Midori-ku", "Hodogaya-ku", "Minami-ku" and "Isogo-ku", which are adjacent to these element regions, are defined as the new candidate regions.

When the name-defined region of the definition-varied name A is redefined, information concerning the new name-defined region, information concerning a center position thereof and information concerning the optimal display scale are created, and the information concerning the definition-varied name A, which has been stored in the defined region storage device 5, is rewritten into the newly created information. Moreover, a portion concerning the definition-varied name A in history information stored in the history information storage device 4 is rewritten so as to correspond to the newly defined name-defined region (Step S610).

Figure 17:
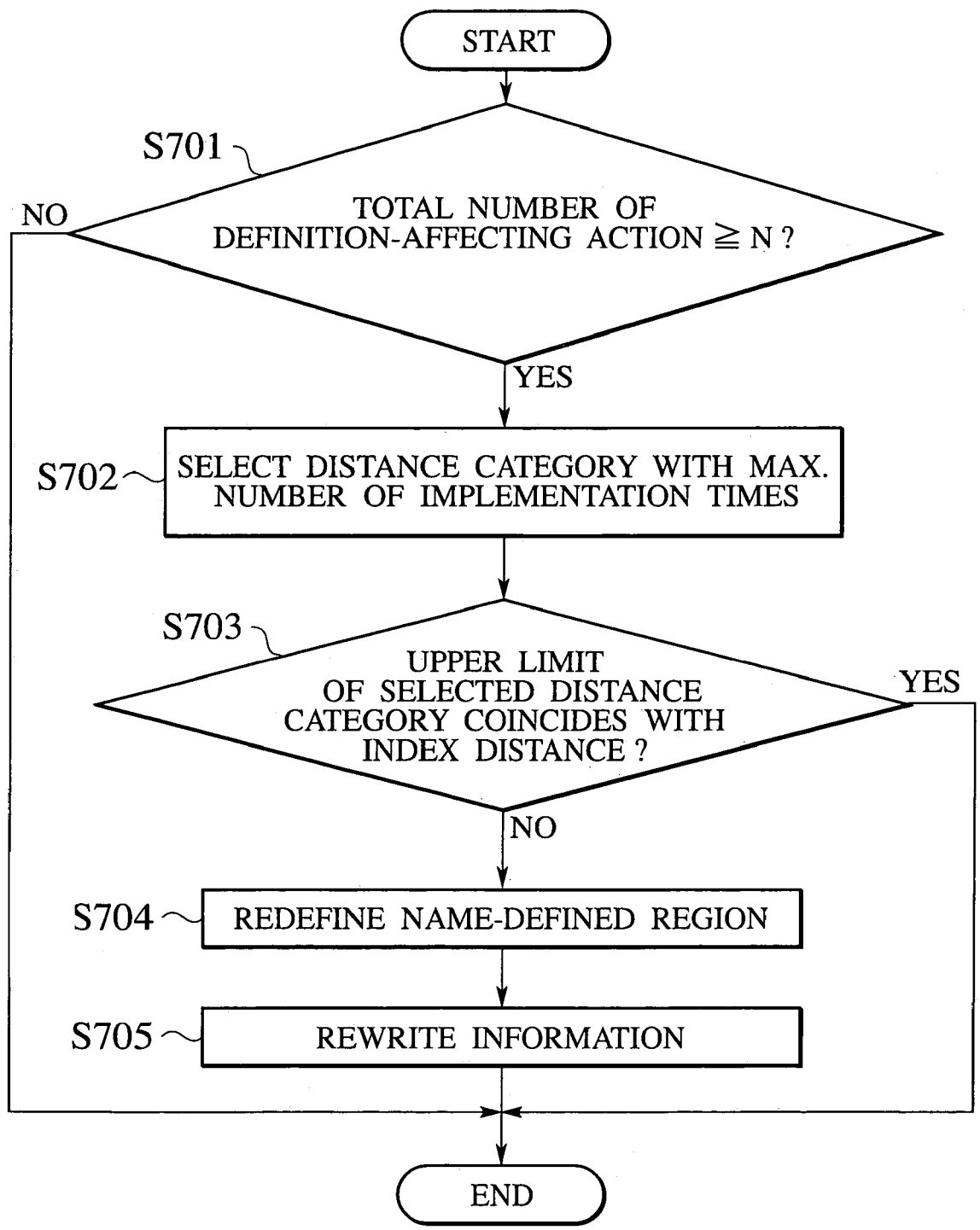
FIG. 17 is a flowchart showing another example of the processing for redefining the name-defined regions based on the history information in the car navigation system.

Next, a flow of processing for redefining the name-defined region of the spot name B will be described with reference to the flowchart of FIG. 17 by taking, as an example, the case where history information as shown in FIG. 10 is stored in the history information storage device 4. This processing is implemented as the redefinition processing for the name-defined region in Step S106 of the flowchart shown in FIG. 8.

First, it is determined whether or not a sum total of the numbers of implementation times of the definition-affecting actions, which have been stored as history information concerning the spot name B, is equal to or larger than the predetermined threshold value N (Step S701). Only when the sum total of the numbers of implementation times of the definition-affecting actions is equal to or larger than the threshold value N, will the processing that follows be implemented.

Specifically, for example, if the threshold value N is set at 50 when the history information shown in FIG. 10 is stored as the information concerning the spot name "Yokohama station", a sum total of the numbers of implementation times of the definition-affecting actions concerning "Yokohama station" is 51 that is larger than the threshold value N. Therefore, the spot name "Yokohama station" is to be subjected to the processing for redefining the name-defined region.

When it is determined that the sum total of the number of implementation times of the definition-affecting actions concerning the spot name B is equal to or larger than the threshold value N, next, a distance category where the number of implementation times of the definition-affecting actions is the maximum is selected (Step S702). Then, it is determined whether or not the upper limit distance of the distance category coincides with the index distance DI of the name-defined region of the name B (Step S703). Then, when the upper limit distance of the selected distance category is different from the index distance DI, the upper limit distance of the selected distance category is defined as a new index distance DI, and the name-defined region of the spot name B is redefined (Step S704).

In the forgoing specific example, the numbers of implementation times of the definition-affecting actions in the distance categories "100 m and below", "over 100 m to 500 m", "over 500 m to 1 km", "over 1 km to 2.5 km", "over 2.5 km to 5 km", and "over 5 km to 10 km" are 11, 24, 13, 3, 0 and 0, respectively. Therefore, the distance category of "over 100 m to 500 m" where the number of implementation times is the maximum is selected. Then, because the upper limit distance of the selected category does not coincide with the 100 m of the original index distance DI, 500 m that is the upper limit distance of the distance category "over 100 m to 500 m" is defined as a new index distance DI, and the name-defined region of "Yokohama station" is redefined.

When the name-defined region of the spot name B is redefined, the information of the index distance DI of the name-defined region and the optimal display scale information, which are stored in the defined region storage device 5, are rewritten into information in accordance with the newly defined name-defined region. In addition, a portion concerning the name B in history information stored in the history information storage device 4 is rewritten so as to correspond to the newly defined name-defined region (Step S705).

As described above, in the car navigation system 1 to which the present invention is applied, the name in which the user command is to be entered is defined as the name-defined region. When accepting the command to change the map image, in which the name is designated, the map image showing substantially the whole of the name-defined region of the name will be displayed. Hence, by referring to the map image displayed in response to the entry of the command, the user can grasp the outline of the whole region indicated by the name designated by him/herself. Particularly, when performing the operation of changing the map image while exploring the target place, the user can easily find the target place without fail. Therefore, the operation of changing the map image can be performed extremely efficiently. Moreover, such a map image in the ideal display mode is suitably displayed by one operation, and therefore, the operation is extremely simple, and improved operability will be realized.

Moreover, in the car navigation system 1 to which the present invention is applied, the operation history of the car navigation system 1 by the user and history information indicating the driving history of the vehicle on which the car navigation system 1 is mounted are stored. Based on the stored history information, the name-defined region is adapted to be redefined according to needs. Therefore, differences in interpretation of a name by each user can be absorbed, and the interpretation by each user and the behavior pattern thereof are suitably reflected on the name-defined region, thus making it possible to realize the optimal display of the map image, which is customized for each user.

Moreover, the number of implementation times of the definition-affecting actions (frequencies of actions) is counted for each of the regions and the distance categories, and the counted number is defined as history information. Based on this history information, the combination of element regions and candidate regions is changed, or the index distance DI is increased/decreased. By use of such a technique, the name-defined region is redefined. Therefore, the accumulation processing for history information and the redefinition of the name-defined region can be realized by simple processing, and reduction of processing load can be achieved.

The present disclosure relates to subject matter contained in Japanese Patent Application No. 2002-338025, filed on Nov. 21, 2002, the disclosure of which is expressly incorporated herein by reference in its entirety.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

What is claimed is:

1. A map image display apparatus for displaying a map image of the vicinity corresponding to a name designated by a user, wherein the designated name is superimposed on the displayed map image, the apparatus comprising:

a defined region storage device configured to store information of a name-defined region defined as a map region corresponding to the designated name, wherein the name-defined region is to be redefined to change a geographical scope thereof based on history information indicating any of an operation history of the map image display apparatus, which is a history of operations thereon by the user, and a driving history of a vehicle on which the map image display apparatus is mounted, information of a center position of the name-defined region, and information of a display scale at which substantially the name-defined region is displayed in full screen; and a display target determination device configured to set the map image corresponding to the designated name to be displayed at the display scale, and set the center position of the name-defined region as the center of the displayed map image, based on the information stored in the defined region storage device, in response to the designated name being entered.

2. The map image display apparatus according to claim 1, further comprising:

a history information storage device configured to store the operation history of the map image display apparatus as the history information; and a defined region changing device configured to redefine the name-defined region based on the history information stored in the history information storage device, and to rewrite each of the information stored in the defined region storage device.

3. The map image display apparatus according to claim 2, wherein the defined region changing device redefines the name-defined region by changing a combination of element regions, each of the element regions being as a map region included in the name-defined region, lower in hierarchy than the name-defined region, and candidate regions, each of the candidate regions being a map region located in periphery of the name-defined region, equivalent in hierarchy to the element regions.

4. The map image display apparatus according to claim 3, wherein the history information stored in the history information storage device includes a number of implementation times of an operation in which the element region or the candidate region is designated.

5. The map image display apparatus according to claim 4, wherein the operation in which the element region or the candidate region is designated comprises an operation, after designating a name of a name-defined region to display a map image thereof, of subsequently further designating any of element regions and candidate regions of the name-defined region to display a map image of the designated element or candidate regions.

6. The map image display apparatus according to claim 4, wherein the operation in which the element region or the candidate region is designated comprises an operation, after designating a name of a name-defined region to display a map image thereof, of performing one of setting of a destination, setting of a route and registration of a spot in the element regions or candidate regions of the name-defined region.

7. The map image display apparatus according to claim 3, wherein the defined region changing device redefines the name-defined region by changing a combination of a plurality of regions, each of the regions being a map region included in the element region or the candidate region, lower in hierarchy than the element region and the candidate region.

8. The map image display apparatus according to claim 1, further comprising:
a history information storage device configured to store, as the history information, the driving history of the vehicle on which the map image display apparatus is mounted; and
a defined region changing device configured to redefine the name-defined region based on the history information stored in the history information storage device, and to rewrite each of the information stored in the defined region storage device.

9. The map image display apparatus according to claim 8, wherein the defined region changing device redefines the name-defined region by changing a combination of element regions, each of the element regions being a map region included in the name-defined region, lower in hierarchy than the name-defined region, and candidate regions, each of the candidate regions being a map region located in periphery of the name-defined region, equivalent in hierarchy to the element region.

10. The map image display apparatus according to claim 9, wherein the history information stored in the history information storage device includes a number of implementation times of parking and stopping the vehicle in the element region or the candidate region.

11. The map image display apparatus according to claim 9, wherein the defined region changing device redefines the name-defined region by changing a combination of a plurality of regions, each of the regions being a map region included in the element region or the candidate region, lower in hierarchy than the element and the candidate region.

12. The map image display apparatus according to claim 1, wherein, when the name indicates a spot, the name-defined region is defined as a map region of a predetermined size having a center thereof set at the spot.

13. The map image display apparatus according to claim 12, further comprising:
a history information storage device configured to store the operation history of the map image display apparatus as the history information; and
a defined region changing device configured to redefine the name-defined region based on the history information stored in the history information storage device, and to rewrite each of the information stored in the defined region storage device.

14. The map image display apparatus according to claim 13, wherein the history information stored in the history information storage device includes a number of implementation times of any operation of setting of a destination, setting of a route and registration of a spot, the operation being performed for a spot within a predetermined distance from a center position of the name-defined region, and the number of implementation times is stored for each distance category from the center position.

15. The map image display apparatus according to claim 13, wherein the defined region changing device redefines the name-defined region by increasing and decreasing a distance from a center position of the name-defined region to an outer edge thereof.

16. The map image display apparatus according to claim 12, further comprising:
a history information storage device configured to store, as the history information, the driving history of the vehicle on which the map image display apparatus is mounted; and
a defined region changing device configured to redefine the name-defined region based on the history information stored in the history information storage device, and to rewrite each of the information stored in the defined region storage device.

17. The map image display apparatus according to claim 16, wherein the history information stored in the history information storage device includes a number of implementation times of parking and stopping the vehicle performed at a spot within a predetermined distance from a center position of the name-defined region where any of setting of a destination, setting of a route or registration of a spot is performed, and the number of implementation times is stored for each distance category from the center position.

18. The map image display apparatus according to claim 16, wherein the defined region changing device redefines the name-defined region by increasing and decreasing a distance from a center position of the name-defined region to an outer edge thereof.

19. A map image display apparatus for displaying a map image of the vicinity corresponding to a name designated by a user, wherein the designated name is superimposed on the displayed map image, the apparatus comprising:

a defined region storage device configured to store information of a name-defined region defined as a map region corresponding to the designated name, information of a center position of the name-defined region, and information of a display scale at which substantially the name-defined region is displayed in full screen;

a display target determination device configured to set the map image corresponding to the designated name to be displayed at the display scale, and set the center position of the name-defined region as the displayed map image, based on the information stored in the defined region storage device, in response to the designated name being entered;

a history information storage device configured to store an operation history of the map image display apparatus and a driving history of a vehicle on which the map image display apparatus is mounted as history information; and a defined region changing device configured to redefine the name-defined region based on the history information stored in the history information storage device, and to rewrite each of the information stored in the defined region storage device, wherein the defined region changing device redefines the name-defined region by changing a combination of element regions, each of the element regions being a map region included in the name-defined region, lower in hierarchy than the name-defined regions, and candidate regions, each of the candidate regions being a map region located in periphery of the name-defined region equivalent in hierarchy to the element region, wherein the history information stored in the history information storage device includes a number of implementation times of an operation in which the element region or the candidate region is designated to be displayed, and a number of implementation times of parking and stopping the vehicle in the element region or the candidate region, and wherein the changing of the combination of the element region and the candidate region for redefining the name-defined region includes deleting, from an aggregate of the element regions of the name-defined region, an element region where total of the number of implementation times of the operation and the number of implementation times of the parking and the stopping is less than a first predetermined value.

20. The map image display apparatus according to claim 19, wherein the changing of the combination of the element region and the candidate region for redefining the name-defined region includes adding, to the aggregate of the element regions of the name-defined region, a candidate region where total of the number of implementation times of the operation and the number of implementation times of the parking and the stopping is larger than a second predetermined value.

21. A program, embodied in a machine-readable medium, for use in a map image display apparatus for displaying a map image of the vicinity corresponding to a name designated by a user, wherein the designated name is superimposed on the displayed map image, the program, when executed by the map image display apparatus, controls the map image display apparatus to realize:

a function to define a map region corresponding to the designated name as a name-defined region, to redefine the name-defined region to change a geographical scope thereof based on history information indicating any of an operation history of the map image display apparatus, which is a history of operations thereon by the user, and a driving history of a vehicle on which the map image display apparatus is mounted, to store information of the name-defined region, information of a center position of the name-defined region, and information of a display scale at which substantially the name-defined region is displayed in full screen, and to display the map image at the display scale with a center thereof set at the center position of the name-defined region, in response to the designated name being entered.

22. A map image display method, comprising the steps of:

displaying a map image corresponding to a name designated by a user, wherein the designated name is superimposed on the displayed map image;

storing information of a name-defined region defined as a map region corresponding to the designated name, information of a center position of the name-defined region, and information of a display scale at which substantially the name-defined region is displayed in full screen;

redefining the name-defined region to change a geographical scope thereof based on history information indicating any of an operation history of the map image display apparatus, which is a history of operations by the user, and a driving history of a vehicle on which the map image display apparatus is mounted: and creating, when the name designated, a map image of a vicinity of the designated name to be displayed at the display scale with a center thereof set at the center position of the name-defined region, based on the stored information thereof, in response to the designated name being entered.

* * * * *